US012098593B2

(12) United States Patent
Chen

(10) Patent No.: US 12,098,593 B2
(45) Date of Patent: Sep. 24, 2024

(54) CORD RETRACTOR AND WINDOW COVERING HAVING SAME

(71) Applicant: Nien Made Enterprise Co., Ltd., Taichung (TW)

(72) Inventor: Lin Chen, Taichung (TW)

(73) Assignee: NIEN MADE ENTERPRISE CO., LTD., Taichung (TW)

( * ) Notice: Subject to any disclaimer, the term of this patent is extended or adjusted under 35 U.S.C. 154(b) by 219 days.

(21) Appl. No.: 17/841,953

(22) Filed: Jun. 16, 2022

(65) Prior Publication Data

US 2023/0140382 A1 May 4, 2023

(30) Foreign Application Priority Data

Nov. 4, 2021 (CN) ......................... 202122684475.5

(51) Int. Cl.
*E06B 9/322* (2006.01)
*E06B 9/324* (2006.01)

(52) U.S. Cl.
CPC .............. *E06B 9/322* (2013.01); *E06B 9/324* (2013.01); *E06B 2009/3222* (2013.01); *E06B 2009/3225* (2013.01)

(58) Field of Classification Search
CPC .. E06B 9/322; E06B 9/324; E06B 2009/3222; E06B 2009/3225
See application file for complete search history.

(56) References Cited

U.S. PATENT DOCUMENTS 3,589,486 A * 6/1971 Kelch .................. G04B 11/006 192/48.92
7,406,995 B2 * 8/2008 Huang .................... E06B 9/322 160/170
7,717,154 B2 * 5/2010 Cheng ..................... E06B 9/322 160/170
8,893,763 B2 * 11/2014 Huang .................... E06B 9/322 160/170
9,127,500 B2 * 9/2015 Huang .................... E06B 9/322
9,260,912 B2 * 2/2016 Huang .................... E06B 9/322
9,366,077 B2 * 6/2016 Chen ....................... E06B 9/322
9,482,049 B2 * 11/2016 Chen ....................... E06B 9/322
9,963,933 B2 * 5/2018 Chen ....................... E06B 9/303
9,976,345 B2 * 5/2018 Chen ....................... E06B 9/322
10,151,140 B2 * 12/2018 Chen ....................... F16D 41/12
(Continued)

*Primary Examiner* — Johnnie A. Shablack
(74) *Attorney, Agent, or Firm* — Birch, Stewart, Kolasch & Birch, LLP

(57) ABSTRACT

A cord retractor for a window covering comprises a housing and a driving wheel, a reeling wheel, a spring, a friction member and a unidirectional transmission mechanism. The driving wheel and the reeling wheel can rotate with each other. The spring is coupled with the driving wheel and is wound on or unwound from the driving wheel according to a rotating direction of the driving wheel. The friction member is in a closed loop shape and surrounding a shaft of the housing. The unidirectional transmission mechanism is coupled with the friction member and the reeling wheel, and operated in different operation modes according to a rotating direction of the reeling wheel, by which the friction member provides constant resistance to the rotation of the reeling wheel when the reeling wheel rotates in a first direction, and stops providing resistance when the reeling wheel rotates in a second direction.

17 Claims, 33 Drawing Sheets

(56) References Cited

U.S. PATENT DOCUMENTS

| | | | | |
|---|---|---|---|---|
| 10,302,172 | B2 * | 5/2019 | Chen | E06B 9/80 |
| 10,480,244 | B2 * | 11/2019 | Chen | E06B 9/42 |
| 10,501,985 | B2 * | 12/2019 | Chen | B65H 75/4471 |
| 10,533,371 | B2 * | 1/2020 | Chen | B65H 75/486 |
| 10,612,299 | B2 * | 4/2020 | Chen | B65H 75/4492 |
| 11,261,655 | B2 * | 3/2022 | Huang | E06B 9/322 |
| 11,459,819 | B2 * | 10/2022 | Liu | B65H 75/486 |
| 2007/0227677 | A1 * | 10/2007 | Yu | E06B 9/322<br>160/170 |
| 2014/0291431 | A1 * | 10/2014 | Huang | E06B 9/322<br>242/372 |
| 2017/0081914 | A1 * | 3/2017 | Wu | E06B 9/327 |
| 2017/0298688 | A1 * | 10/2017 | Chen | E06B 9/322 |
| 2017/0321477 | A1 * | 11/2017 | Chen | F16D 41/12 |
| 2018/0313143 | A1 * | 11/2018 | Chang | E06B 9/322 |
| 2023/0140382 | A1 * | 5/2023 | Chen | E06B 9/324<br>160/266 |

* cited by examiner

CORD RETRACTOR AND WINDOW COVERING HAVING SAME

BACKGROUND OF THE DISCLOSURE

Field of the Disclosure

The present disclosure generally relates to a cord retractor of a window covering, and more particularly relates to the cord retractor providing different resistance in the cord retracting direction and the cord releasing direction.

Description of the Prior Art

Window coverings are commonly applied to the openings of buildings, e.g., window or door, for adjusting light or improving privacy. The window coverings, which have vertically adjustable shading areas, can be roughly divided into two types by way of operation. One is controlled by using the cords as another is not, which is so-called cordless window covering. A conventional cordless window covering includes an upper rail, one or more coverings, a bottom rail and a driving mechanism which assists in extending or retracting the covering. Some cordless window coverings may further include a middle rail. The driving mechanism may include a lift cord and a driving unit, wherein the driving unit is usually a spring box disposed in the upper rail and may include a reeling wheel, a driving wheel, a spring wheel and a spring. The spring is coupled with the driving wheel and the spring wheel. The reeling wheel and the driving wheel are intermeshed for driving each other to rotate. One end of the lift cord is coupled with the reeling wheel as another end is extending out from the upper rail, penetrating through the coverings, and extending to and coupled with the bottom rail. When the bottom rail is pulled down for extending the covering, the part of the lift cord wrapped around the reeling wheel is released from the reeling wheel, and the reeling wheel is driven to rotate. The rotation of the reeling wheel drives the driving wheel to rotate correspondingly, by which the spring is wound on the driving wheel and stores a spring force. When the bottom rail is raised for retracting the covering, the spring force is released and the driving wheel is driven to rotate reversely, which drives the reeling wheel to rotate reversely and the part of the lift cord exposed outside is thereby retracted.

The weight of the bottom rail and the weight of the portion of the covering that is stacked on the bottom rail collectively form a gravitational force. Without any other external force acting on the bottom rail, the difference between aforesaid spring force and aforesaid gravitational force may form an upward force or a downward force applied to the covering and the bottom rail. Accordingly, the covering and the bottom rail would move upwardly or downwardly. At this moment, a static friction great enough is required for resisting such upward force or such downward force in order to maintain the bottom rail in an expected position. However, the spring force, the gravitational force and the friction are variable while the bottom rail and the covering are moving. As a result, the cordless window coverings usually have the problem that the bottom rail moves upwardly or downwardly after the operation has stopped. For instance, when the user applies a downwardly external force to the bottom rail for pulling it down and extending the covering, the gravitational force may gradually reduce because of reduction of the portion of the covering that is stacked on the bottom rail. After the downwardly external force has been removed, the bottom rail may move upwardly because the spring force is too large and the friction cannot compensate the over large spring force. Or the bottom rail may move downwardly because the spring force is too small to independently support the bottom rail and the covering, while the friction cannot compensate the over large gravitational force. In both situations, the bottom rail fails to stay in a designated position. Such drawback of the conventional cordless window coverings causes inconvenience.

SUMMARY OF THE DISCLOSURE

In light of the above reasons, one aspect of the present disclosure is to provide a cord retractor applied to the cordless window coverings and can provide resistance in a single direction to resolve the problem of the cordless window coverings that cannot be stationary in a certain position.

To achieve the above objective, the cord retractor according to one embodiment of the present disclosure is provided, and the cord retractor comprises a housing, comprising a bottom plate and a shaft situated on a first side of the bottom plate. A driving wheel, situated on the first side of the bottom plate. A spring, received in the housing and comprising a first end coupled with the driving wheel, wherein the spring is wound on the driving wheel or unwound from the driving wheel according to a rotating direction of the driving wheel. A reeling wheel, situated on the first side of the bottom plate and coupled with the driving wheel for rotating with the driving wheel. A friction member in a closed loop shape and surrounding the shaft. A first limiting member, situated outside the friction member and comprising an arm. A second limiting member, situated outside the first limiting member and comprising a plurality of ratchets for engaging with the arm of the first limiting member, wherein the second limiting member is driven by the reeling wheel for rotating with the reeling wheel. When the reeling wheel rotates in a first direction, the second limiting member is driven to rotate in a locking direction with respect to the first limiting member, thereby making the arm of the first limiting member engaged between two neighboring ratchets of the second limiting member, after which the first limiting member rotates together with the second limiting member, and one of a first frictional force and a second frictional force is generated for providing substantially constant resistance to rotation of the reeling wheel. The first frictional force is generated between the first limiting member and the friction member, as the first limiting member rotates with respect to the friction member, and the second frictional force is generated between the friction member and the shaft, as the friction member is driven by the first limiting member to rotate with respect to the shaft. When the reeling wheel rotates in a second direction opposite to the first direction, the second limiting member is driven to rotate in an unlocking direction with respect to the first limiting member, and the arm of the first limiting member skids over the ratchets of the second limiting member, so that the first limiting member is not driven to rotate together with the second limiting member, and the friction member does not rotate with respect to the shaft or the first limiting member, therefore the friction member does not provide resistance to the rotation of the reeling wheel when the reeling wheel rotates in the second direction.

To achieve the above objective, the cord retractor according to another embodiment of the present disclosure is provided, and the cord retractor comprises a housing, comprising a bottom plate and a shaft situated on a first side of the bottom plate. A driving wheel, situated on the first side of the bottom plate. A spring, received in the housing and comprising a first end coupled with the driving wheel, wherein the spring is wound on the driving wheel or unwound from the driving wheel according to a rotating direction of the driving wheel. A reeling wheel, situated on the first side of the bottom plate and coupled with the driving wheel for rotating with the driving wheel. A friction member in a closed loop shape and surrounding the shaft. A unidirectional transmission mechanism coupled with the friction member and the reeling wheel and operated in one of a first operation mode and a second operation mode according to a rotating direction of the reeling wheel. When the reeling wheel rotates in a first direction, the unidirectional transmission mechanism is driven to operate in the first operation mode with the friction member to generate a frictional force for providing substantially constant resistance to rotation of the reeling wheel. When the reeling wheel rotates in a second direction opposite to the first direction, the unidirectional transmission mechanism is driven to operate in the second operation mode and restricts the friction member from providing resistance to the rotation of the reeling wheel.

To achieve the above objective, the window covering according to one embodiment of the present disclosure is provided, wherein the window covering comprises an upper rail. One or more covering materials, provided below the upper rail. A bottom rail, provided below the one or more covering materials. A lift cord coupled between the upper rail and the bottom rail. A cord retractor for receiving or releasing the lift cord for respectively moving the bottom rail towards or away from the upper rail, wherein the cord retractor comprises a housing, having a bottom plate and a shaft situated on a first side of the bottom plate. A driving wheel, situated on the first side of the bottom plate. A spring, received in the housing and comprising a first end coupled with the driving wheel, wherein the spring is wound on the driving wheel or unwound from the driving wheel according to a rotating direction of the driving wheel. A reeling wheel, situated on the first side of the bottom plate and coupled with the driving wheel for rotating with the driving wheel. A friction member in a closed loop shape and surrounding the shaft. A first limiting member, situated outside the friction member and comprising an arm. A second limiting member, situated outside the first limiting member and comprising a plurality of ratchets for engaging with the arm of the first limiting member, wherein the second limiting member is driven by the reeling wheel to rotate with the reeling wheel. When the reeling wheel rotates in a first direction, the second limiting member is driven to rotate in a locking direction with respect to the first limiting member, thereby making the arm of the first limiting member engaged between the two neighboring ratchets of the plurality of ratchets of the second limiting member, after which the first limiting member rotates together with the second limiting member, and one of a first frictional force and a second frictional force is generated for providing substantially constant resistance to rotation of the reeling wheel. The first frictional force is generated between the first limiting member and the friction member, as the first limiting member rotates with respect to the friction member, and the second frictional force is generated between the friction member and the shaft, as the friction member is driven by the first limiting member to rotate with respect to the shaft. When the reeling wheel rotates in a second direction opposite to the first direction, the second limiting member is driven to rotate in an unlocking direction with respect to the first limiting member, and the arm of the first limiting member skids over the ratchets of the second limiting member, so that the first limiting member is not driven to rotate together with the second limiting member, and the friction member does not rotate with respect to the shaft or the first limiting member, such that the friction member does not provide resistance to the rotation of the reeling wheel while the reeling wheel rotates in the second direction.

BRIEF DESCRIPTION OF THE DRAWINGS

The present disclosure will be understood by referring to the following detailed description of some illustrative embodiments in conjunction with the accompanying drawings, in which.

DETAILED DESCRIPTION

Figure 1:
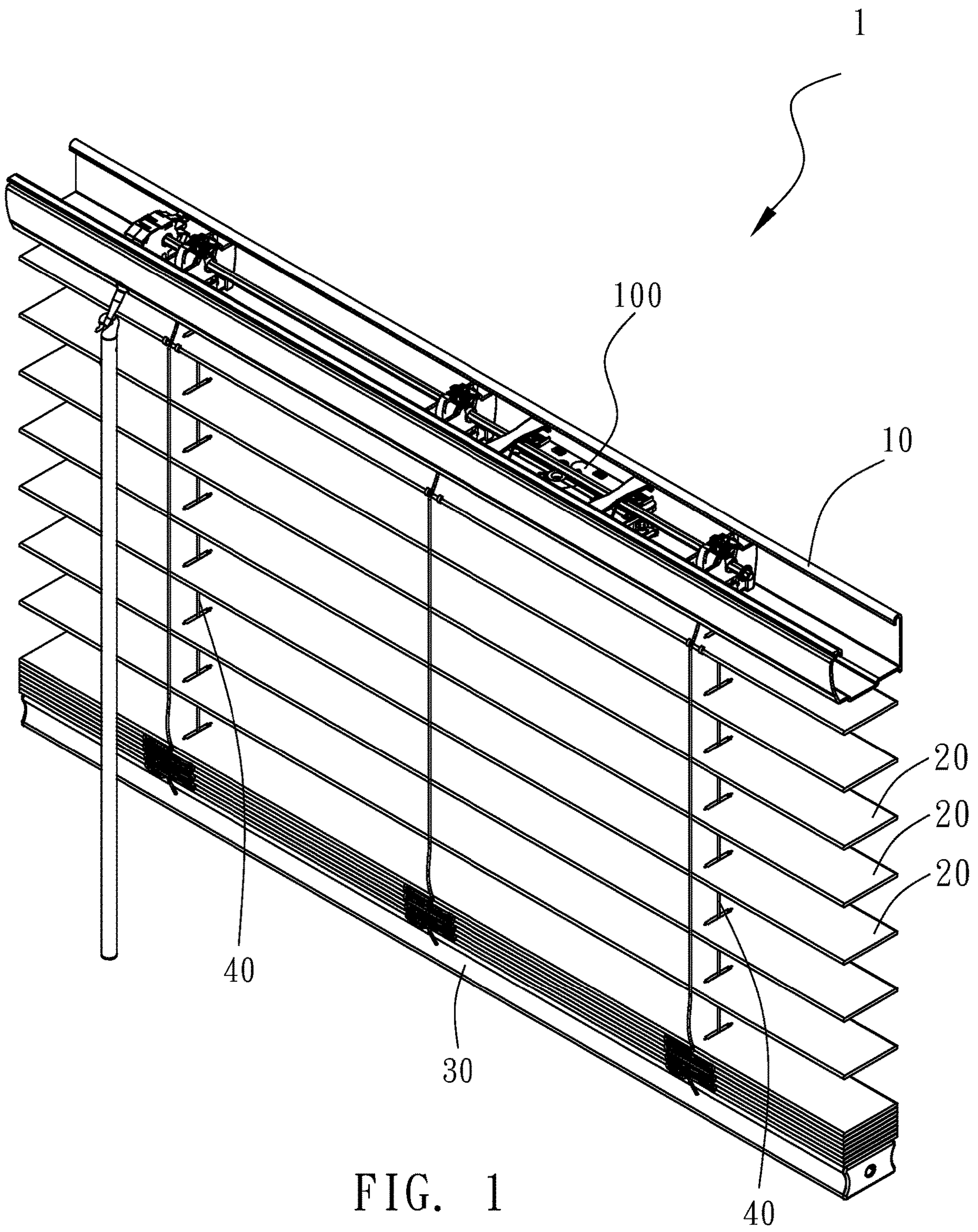
FIG. 1 is a perspective view of the window covering having the cord retractor of the present disclosure.

In the following paragraphs and the accompanying drawings, the features and the implementations of several embodiments of the present disclosure are described in more detail along with the accompanying drawings. The features and the implementations described in the following paragraphs can be adopted solely or in combination with each other. In addition, the embodiments can be modified in various forms, as disclosed in the following paragraphs, and should not be limited to the embodiments described in the following paragraphs. Unless specified otherwise, the same reference characters refer to the same components.

The technical features provided in the present disclosure are not limited to the specific structures, uses, and applications described in the embodiments. The language used in the descriptions is illustrative and descriptive language which can be understood by the person of ordinary skill in the art. The terms regarding directions mentioned in the specification, including "front", "rear", "up", "down", "left", "right", "top", "bottom", "inside", and "outside", are illustrative and descriptive terms based on common usage scenarios, and manifests no intent to limit the scope of claims.

Furthermore, the definite and indefinite articles "a" and "the" and the numerical term "one" used in the specification referring to components of singular form do not exclude the concept of plural form. Equivalences known by one having ordinary skill in the art should be also included. All conjunctions used in similar situations should be interpreted in the broadest ways. The specific shapes, structural features, and technical terms described in the descriptions should also be interpreted to include equivalent structures and techniques which could achieve the same functionality.

Please refer to FIG. 1, which shows a cordless window covering 1 having the cord retractor of the present disclosure. The cordless window covering 1 comprises an upper rail 10, a plurality of covering materials 20, a bottom rail 30, two lift cords 40 and a cord retractor 100. The upper rail 10 has a horizontally extending hollow casing for receiving at least part of the lift cords 40 and the cord retractor 100. The covering materials 20 are also horizontally extending and arranged one-by-one below the upper rail 10. The bottom rail 30 also has a horizontally-extending hollow casing and located below the lowest one of the covering materials 20.

The cord retractor 100 is disposed within the upper rail 10. One end of each lift cord 40 is coupled with the cord retractor 100 as another end of each lift cord 40 is extending out from the upper rail 10, penetrating through the covering materials 20, and extending to and coupled with the bottom rail 30. While the bottom rail 30 is pushed upwardly towards the upper rail 10, the covering materials 20 are stacked on the bottom rail 30 one by one from the lowest to the highest and moving towards the upper rail 10 together with the bottom rail 30. Meanwhile, the exposed parts of the lift cords 40 are retracted by the cord retractor 100 for retracting the window covering 1. On the other hand, while the bottom rail 30 is pulled downwardly away from the upper rail 10, the covering materials 20 separate from one another sequentially from the highest to the lowest one and moving away from the upper rail 10 together with the bottom rail 30. Meanwhile, the lift cords 40 are released by the cord retractor 100 for extending the window covering 1.

Figure 2:
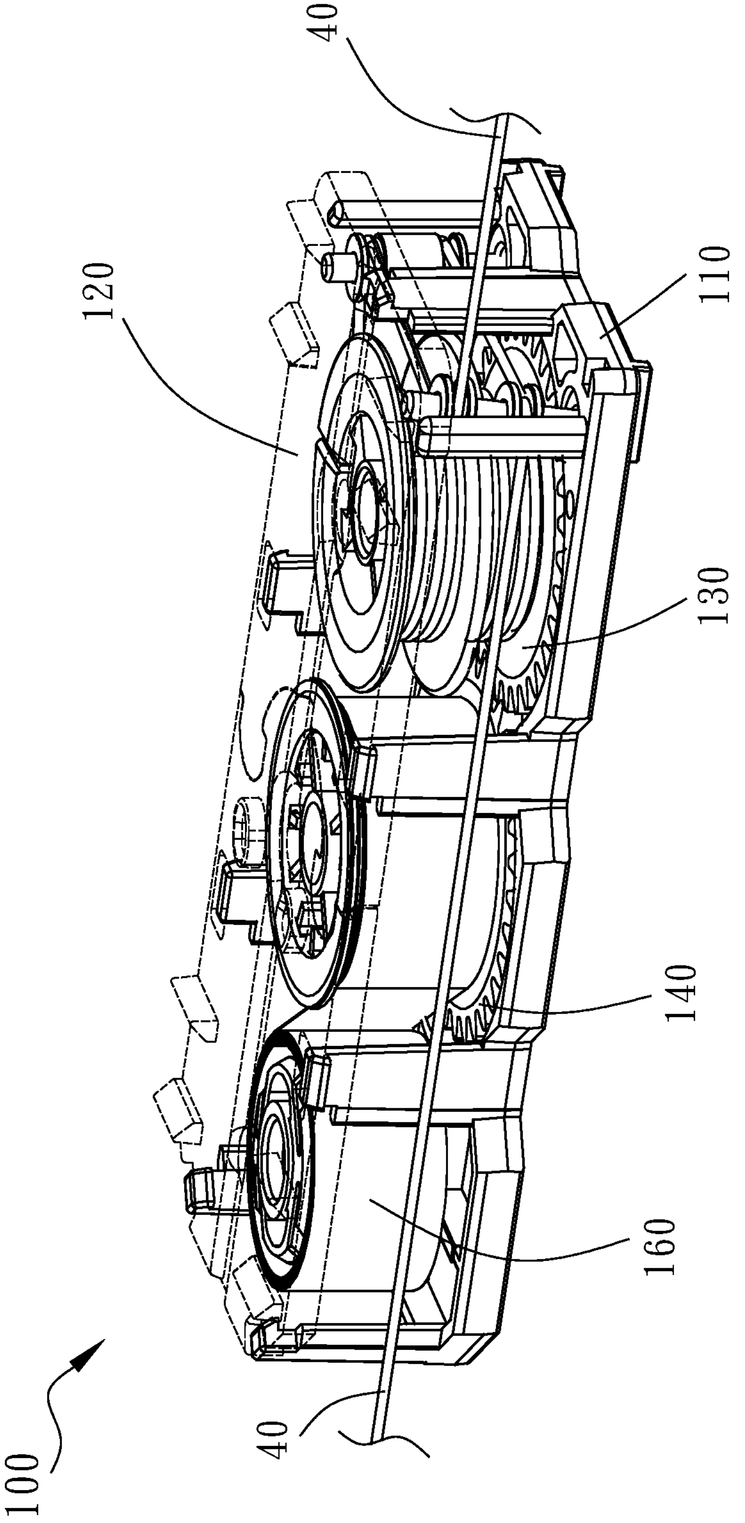
FIG. 2 is a perspective view of the cord retractor according to a first preferred embodiment of the present disclosure.
Figure 3:
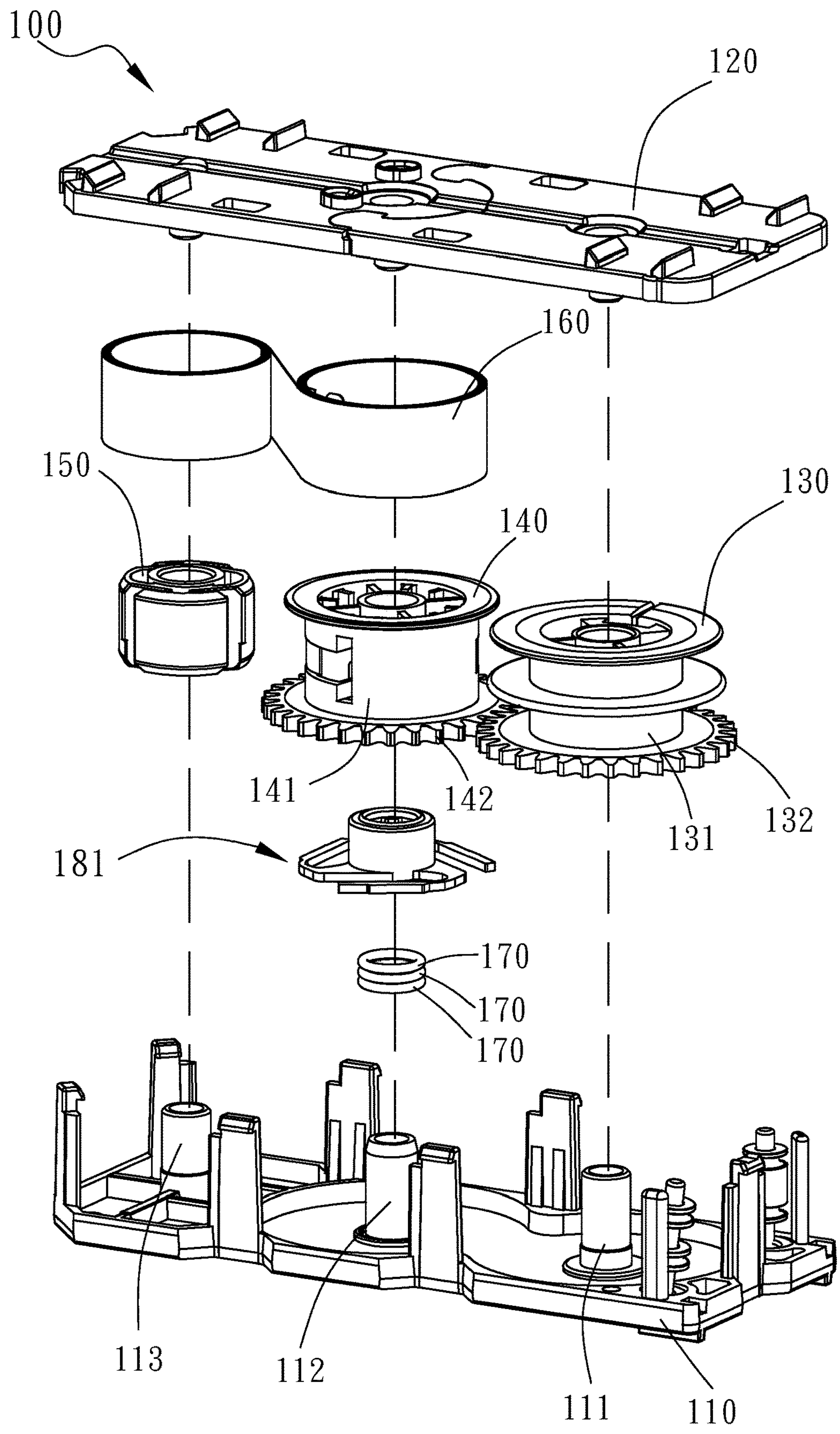
FIG. 3 is an exploded view of the cord retractor in FIG. 2.
Figure 4:
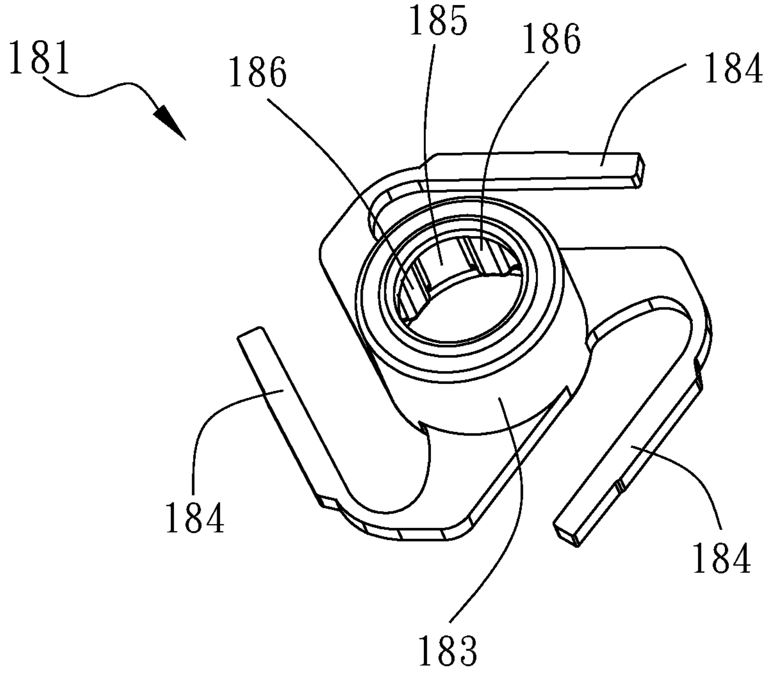
FIG. 4 is a perspective view of the first limiting member in FIG. 2.
Figure 5:
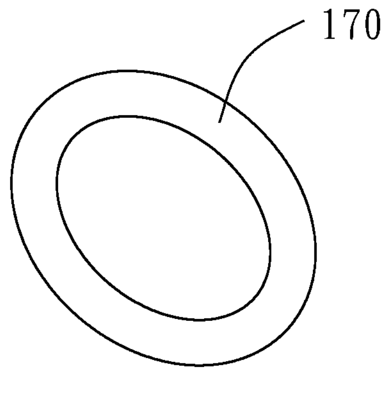
FIG. 5 is a perspective view of the friction member in FIG. 2.

In a first preferred embodiment of the present disclosure, referring to FIGS. 2 to 13, the cord retractor 100 comprises a housing, and a reeling wheel 130, a driving wheel 140, a spring wheel 150, a spring 160, a friction member 170 and a unidirectional transmission mechanism 180 which are contained in the housing. The housing comprises a bottom plate 110 and an upper cover 120, as well as a first shaft 111, a second shaft 112 and a third shaft 113 disposed on a first surface of the bottom plate 110. As shown in FIG. 2 and FIG. 3, the reeling wheel 130, the driving wheel 140 and the spring wheel 150 are sleeved on the first shaft 111, the second shaft 112 and the third shaft 113, respectively. The reeling wheel 130 comprises a wheel body 131 and a reeling gear 132, wherein the wheel body 131 is divided into an upper portion and a lower portion, and the reeling gear 132 is disposed around the periphery of an end surface of the wheel body 131 close to the bottom plate 110. The wheel body 131 is sleeved on the first shaft 111 to make the reeling wheel 130 rotatable about the first shaft 111. The two lift cords 40 are coupled with and wound on the upper portion and the lower portion of the wheel body 131, respectively. The two lift cords 40 are wound in the same direction so as to be released or retracted together when the reeling wheel 130 is rotating.

The driving wheel 140, the spring wheel 150 and the spring 160 collaboratively form a powering unit, which provides the window covering 1 with a retracting force. The driving wheel 140 comprises a hollow body 141 and a driving gear 142 disposed around the periphery of an end surface of the hollow body 141 close to the bottom plate 110. The driving gear 142 meshes with the reeling gear 132 of the reeling wheel 130 such that the reeling wheel 130 and the driving wheel 140 can drive each other to rotate concurrently. The spring wheel 150 is an idler sleeved on the third shaft 113. The spring 160 is a torsion spring having a first end and a second end, wherein the first end is coupled with and wound on the driving wheel 140, and the second end is coupled with and wound on the spring wheel 150. According to a rotating direction of the driving wheel 140, the spring 160 is wound on the driving wheel 140 and unwound from the spring wheel 150 synchronously, or alternatively, wound on the spring wheel 150 and unwound from the driving wheel 140 synchronously. In view of the action of the spring 160, the spring wheel 150 can be driven by the driving wheel 140 to rotate.

The friction member 170 is in a closed loop shape and sleeved on the second shaft 112. The friction member 170 may comprise at least one of a rubber component, a silicon component and an elastic plastic component. Moreover, an inside diameter of the friction member 170 does not change while the friction member 170 is sleeved on the second shaft 112 and provides resistance to the rotation of the reeling wheel 130. In this embodiment, as shown in FIG. 3, the friction member 170 comprises three O-shaped rings, which are closely sleeved on the second shaft 112 to form a tight fit or an interference fit therebetween. Such O-shaped ring is a conventional seal component commonly used in industry, which is usually made of nitrile butadiene rubber, fluoroelastomer materials (known as FKM) or silicone. It has elasticity and is capable of bearing frequent friction, and hardly being affected by the change of temperature, which make it a low cost and reliable friction member. The friction member 170 is not limited to the O-shaped rings which have a circular cross section, as the cross section of the friction member 170 can also be square, rectangular or any suitable shape. In some other embodiments, the cross section of the friction member 170 may have a plural-circles-union shape, which is similar to the cross section of plural O-shaped rings stacked together along a longitudinal direction but the plural O-shaped rings are formed integrally. As long as the friction member is formed of an elastic ring, the different cross sections will not affect the use of the friction member.

Figure 6:
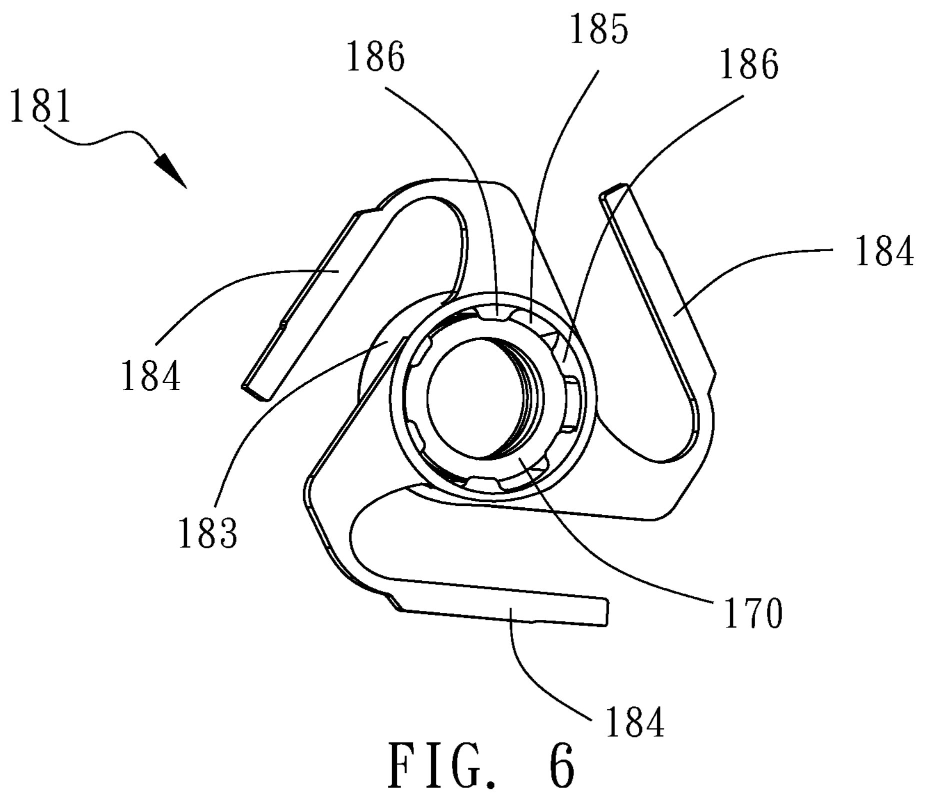
FIG. 6 is a perspective view of the combination of the first limiting member and the friction member in FIG. 2.
Figure 7:
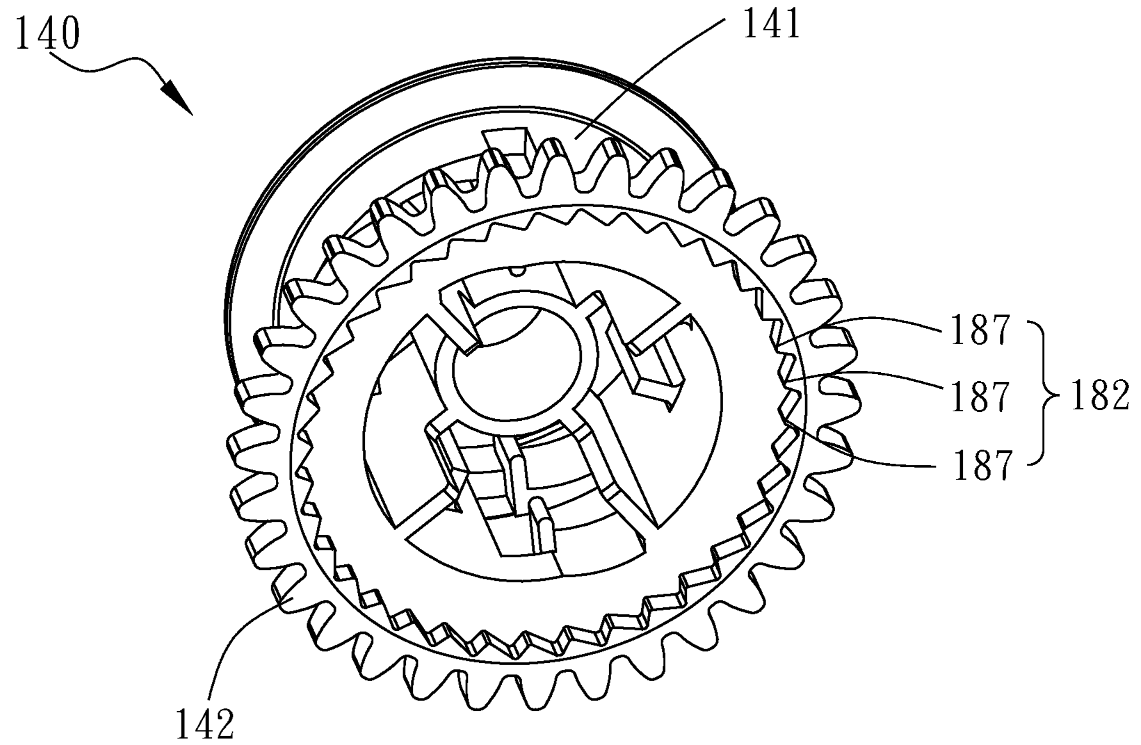
FIG. 7 is a perspective view of the combination of the driving wheel and the second limiting member in FIG. 2.
Figure 9:
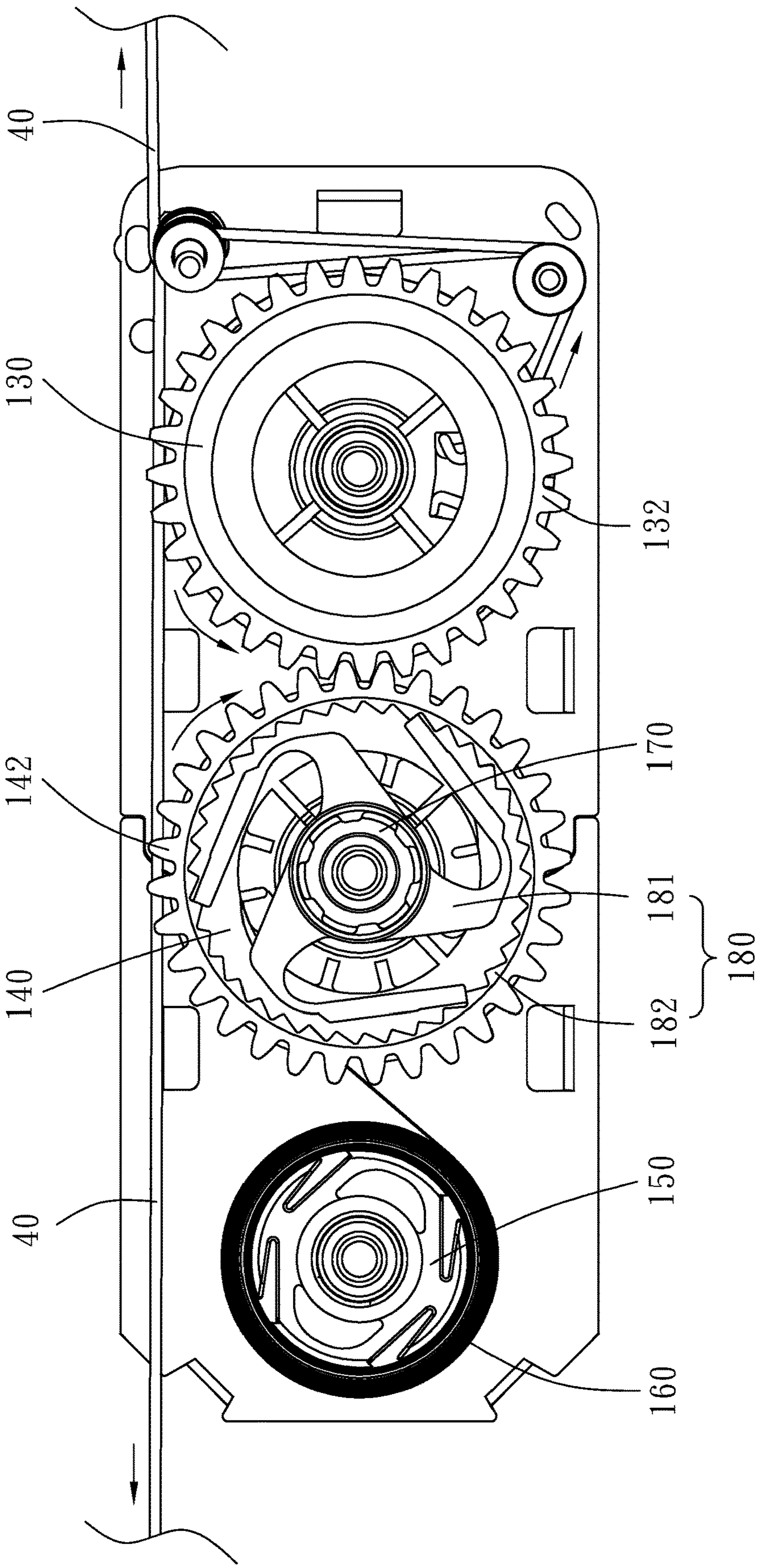
FIG. 9 is a bottom view of the cord retractor in FIG. 2 without the bottom plate of the housing, illustrating the action of the cord retractor while the window covering is operated to be extended.

Referring to FIGS. 3 to 7 and FIG. 9, in this embodiment, the unidirectional transmission mechanism 180 is received within the driving wheel 140 and comprises a first limiting member 181 and a second limiting member 182 (shown in FIG. 9). The first limiting member 181 comprises a main body 183 which is hollow, and three arms 184 radially extending out from the periphery of the main body 183. The arms 184 are spaced apart from each other by the same interval. Each arm 184 is made by an elastic material and is deformable with respect to the main body 183. Moreover, as shown in FIG. 6, there are several bumps 186 on an inner wall 185 of the main body 183. The bumps 186 are abutting against the outer periphery of the friction member 170 for a tight fit therebetween while the friction member 170 is disposed between the main body 183 and the second shaft 112. Referring to FIG. 7, the second limiting member 182 is exemplified by plural ratchets 187 situated on an inner wall of the hollow body 141 of the driving wheel 140. As so, the second limiting member 182 can rotate together with the driving wheel 140. The form of the second limiting member 182 can be the ratchets 187 integrally formed with the driving wheel 140, or an internal toothed ring gear as an independent component that the hollow body 141 of the driving wheel 140 is sleeved on and fixedly coupled with for rotating together.

Please refer to FIGS. 8 to 13, which show a status of the cord retractor 100 as all components thereof have been assembled and illustrate the interactions among the components of the cord retractor 100 while the window covering 1 is extending or retracting. As shown, the friction member 170 and the unidirectional transmission mechanism 180 have been installed within the driving wheel 140. The friction member 170 is sleeved tightly on the second shaft 112. The main body 183 of the first limiting member 181 is sleeved on and closely engaged with the friction member 170 by the bumps 186 protruding from the inner wall 185 of the main body 183, thereby forming a tight fit between the friction member 170 and the first limiting member 181. Meanwhile, the ratchets 187 of the second limiting member 182, which are situated on the inner wall of the hollow body 141 of the driving wheel 140, are in contact with the arms 184 of the first limiting member 181.

In this embodiment, no matter where the window covering 1 is moved while extending or retracting, a rewinding force provided by the spring 160 to the lift cords 40 is set to be less than a downward force generated by the weight of the bottom rail 30 and the covering materials 20 stacked thereon. As a result, if there is no intervention of any other external force, e.g., the friction provided by the friction member, the bottom rail 30 will descend and the lift cords 40 will be correspondingly released until the window covering 1 is completely extended.

Figure 8:
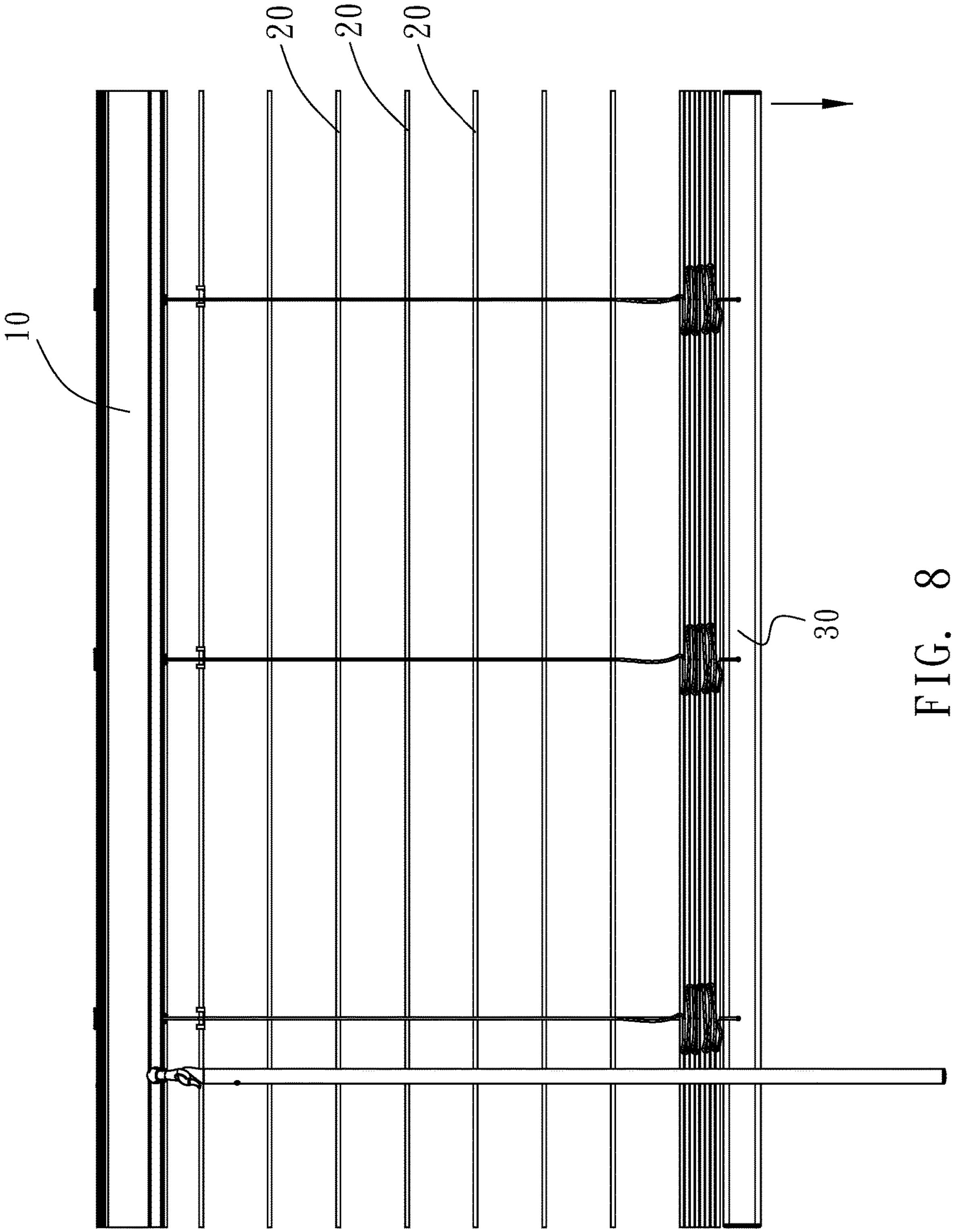
FIG. 8 is a schematic diagram illustrating the window covering in FIG. 1 is operated to be extended by lowering the bottom rail.
Figure 10:
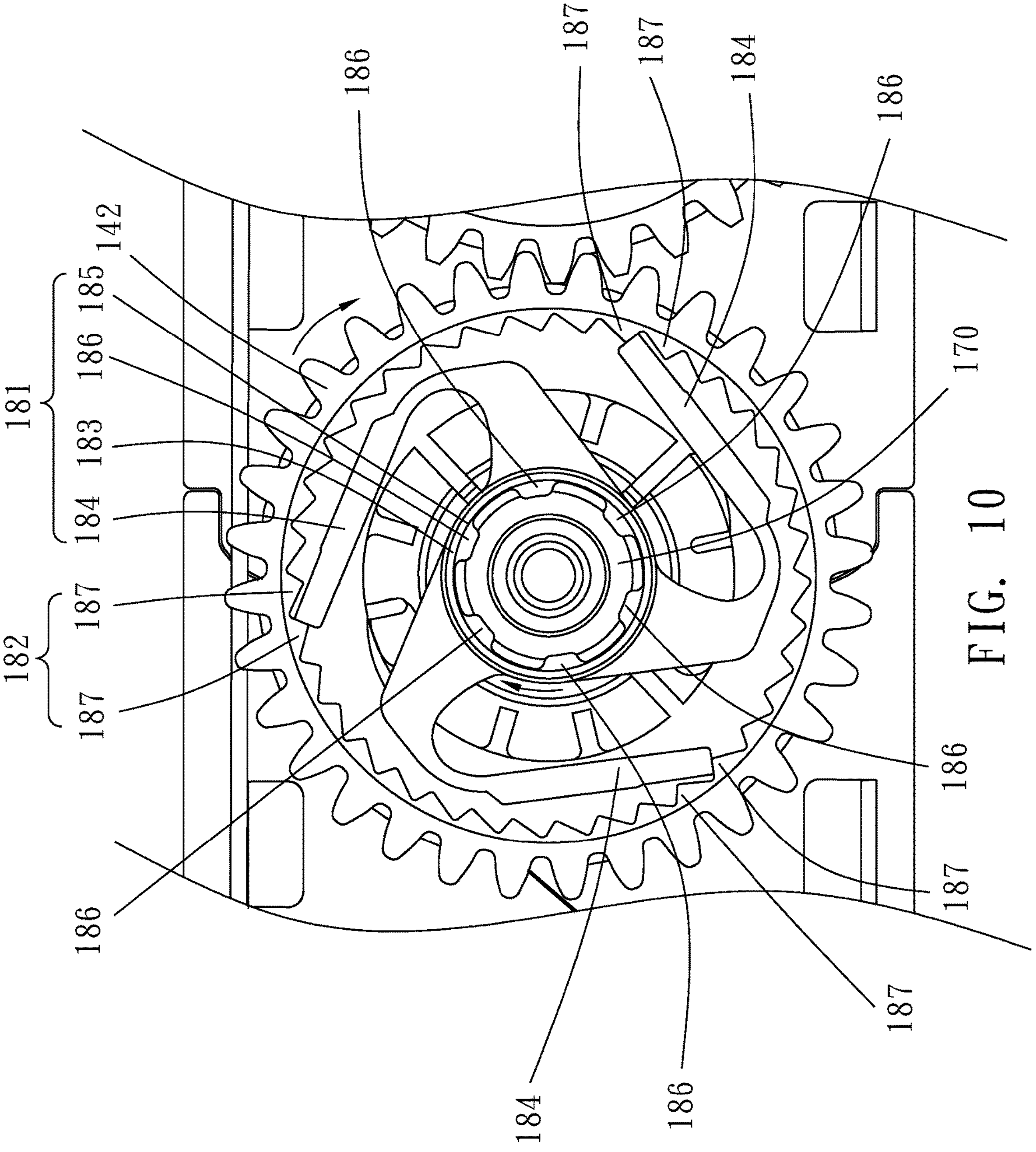
FIG. 10 is an enlarged view of the unidirectional transmission mechanism and the driving wheel in FIG. 9.

Please refer to FIGS. 8 to 10, as the bottom plate 110 of the housing has been removed in FIG. 9 and FIG. 10 for clearly showing the interactions among the components of the cord retractor 100. When the window covering 1 is operated to be extended, the user drags down the bottom rail 30, which correspondingly pulls the lift cords 40 in the downward direction. Thereby, the reeling wheel 130 coupled with the lift cords 40 rotates in a first direction for releasing the lift cords 40 wound on the wheel body 131. While the reeling wheel 130 rotates in the first direction, the driving gear 142 meshed with the reeling gear 132 is driven to rotate with the reeling wheel 130, which makes the spring 160 wound on the driving wheel 140 for storing the rewinding force. In this embodiment, the first direction is in a counterclockwise direction as designated in FIG. 9. When the reeling wheel 130 rotates in the first direction, it drives the driving wheel 140 engaged therewith to rotate reversely (e.g., in a clockwise direction), and the second limiting member 182 rotates in the same direction (e.g., in a clockwise direction) with the driving wheel 140 as it moves together with the driving wheel 140.

Please refer to FIG. 10, which is a partial enlarged view of FIG. 9. The second limiting member 182 rotates together with the driving wheel 140 in the clockwise direction with respect to the first limiting member 181. When the second limiting member 182 rotates to a position that each arm 184 of the first limiting member 181 is engaged with the recess between the two neighboring ratchets 187, each arm 184 is in a first position as shown in FIG. 10, and the second limiting member 182 and the first limiting member 181 are therefore inter-locked. In other words, the first limiting member 181 is driven to rotate together with the second limiting member 182 when the second limiting member 182 rotates. This status in which the second limiting member 182 and the first limiting member 181 rotate in unison is defined as a first operation mode hereinafter, and the direction which the second limiting member 182 rotates in is defined as a locking direction. When the second limiting member 182 rotates in the locking direction, the unidirectional transmission mechanism 180 is driven to operate in the first operation mode. In this embodiment, the locking direction of the second limiting member 182 is a clockwise direction.

In this embodiment, a first maximum static friction between the first limiting member 181 and the friction member 170 is greater than a second maximum static friction between the friction member 170 and the second shaft 112. Once a force driving the first limiting member 181 to rotate (equals to the force driving the second limiting member 182 to rotate, or the force driving the driving wheel 140 to rotate, or the force driving the reeling wheel 130 to rotate, or the force exerted by the user on the bottom rail 30 to release the lift cords 40, or the force driving the window covering 1 to be extended) is greater than the second maximum static friction between the friction member 170 and the second shaft 112, the second limiting member 182 drives the first limiting member 181 together with the friction member 170 to rotate with respect to the second shaft 112 immediately. While rotating, the force driving the first limiting member 181 to rotate must resist the slip friction between the friction member 170 and the second shaft 112. While the window covering 1 is operated to be extended, the friction member 170 rubs against the second shaft 112, as the contact surface between the friction member 170 and the second shaft 112 is in the form of a continuous uninterrupted loop. Moreover, an inside diameter of the friction member 170 does not change while the friction member 170 rubs against the second shaft 112. Therefore, the friction member 170 continuously and stably provides constant resistance to the cord retractor 100. Such constant resistance can prevent the bottom rail 30 from falling down uncontrollably and spontaneously, while the user is dragging down the bottom rail 30. Thus, the user can control the moving speed and moving distance of the bottom rail 30 easily.

In some other embodiments, the first maximum static friction between the first limiting member 181 and the friction member 170 is less than the second maximum static friction between the friction member 170 and the second shaft 112. Once the driving force is greater than the first maximum static friction, the first limiting member 181 rotates with respect to the friction member 170 whereas the friction member 170 remains still and will not rotate with respect to the second shaft 112. There is also a slip friction existing between the first limiting member 181 and the friction member 170 while the first limiting member 181 rotates. Since the first limiting member 181 continuously rubs against the friction member 170, the friction member 170 still provides constant resistance to the cord retractor 100.

In more detail, while the user drags down the bottom rail 30, the lift cords 40 drive the unidirectional transmission mechanism 180 to operate in the first operation mode. In other words, the second limiting member 182 rotates in the locking direction till each arm 184 of the first limiting member 181 is engaged with the recess between two neighboring ratchets 187 of the second limiting member 182. In this circumstance, even if the user lets go of the bottom rail 30 to stop pulling down the bottom rail 30, there is still a downward resultant force acting on the cord retractor 100 due to the reason that a downward force generated by the weight of the bottom rail 30 and the covering materials 20 stacked thereon is greater than the rewinding force provided by the spring 160. Thus, the arms 184 of the first limiting member 181 are maintained in the first positions as each arm 184 is engaged with the recess between two neighboring ratchets 187. Moreover, the maximum static friction could be generated by the friction member 170 is set to be always greater than the difference obtained by subtracting the rewinding force provided by the spring 160 from the downward force generated by the weight of the bottom rail 30 and the covering materials 20 stacked thereon. Therefore, when the user stops dragging down the bottom rail 30, the downward force generated by the weight of the bottom rail 30 and the covering materials 20 stacked thereon, the rewinding force provided by the spring 160, and the static friction correspondingly generated by the friction member 170 make a balance to maintain the bottom rail 30 in the current position and prevent the bottom rail 30 from descending.

Once the user drags down the bottom rail 30 again, the second limiting member 182 directly and immediately drives the first limiting member 181 to rotate. Thus, even if the user drags down the bottom rail 30 in an intermittent way, the friction member 170 accurately provides constant resistance to the cord retractor 100 every time the user starts dragging the bottom rail 30, which is carried out in view of the collaboration of the first limiting member 181 and the second limiting member 182 of the unidirectional transmission mechanism 180.

Figure 11:
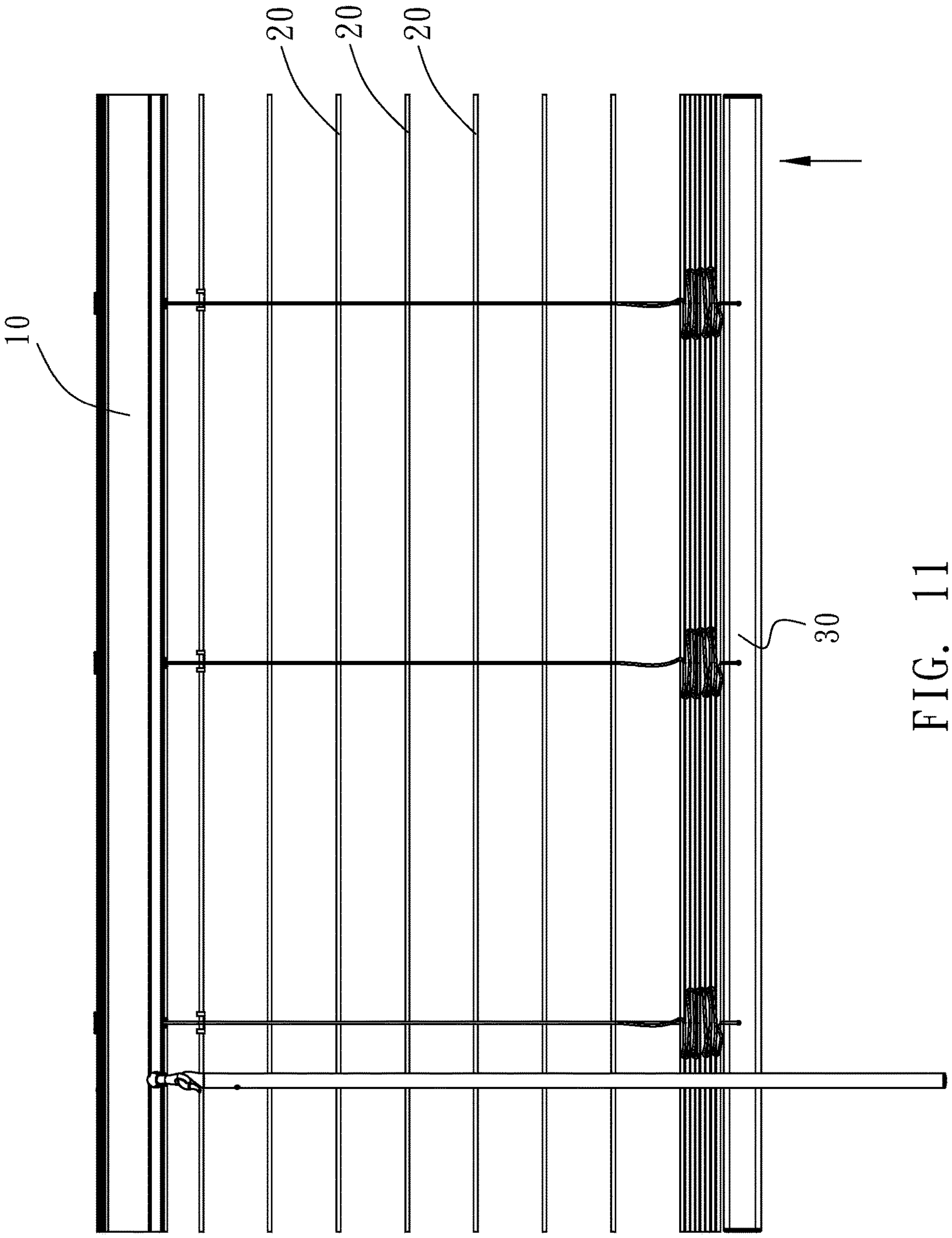
FIG. 11 is a schematic diagram illustrating the window covering in FIG. 1 is operated to be retracted by raising the bottom rail.
Figure 12:
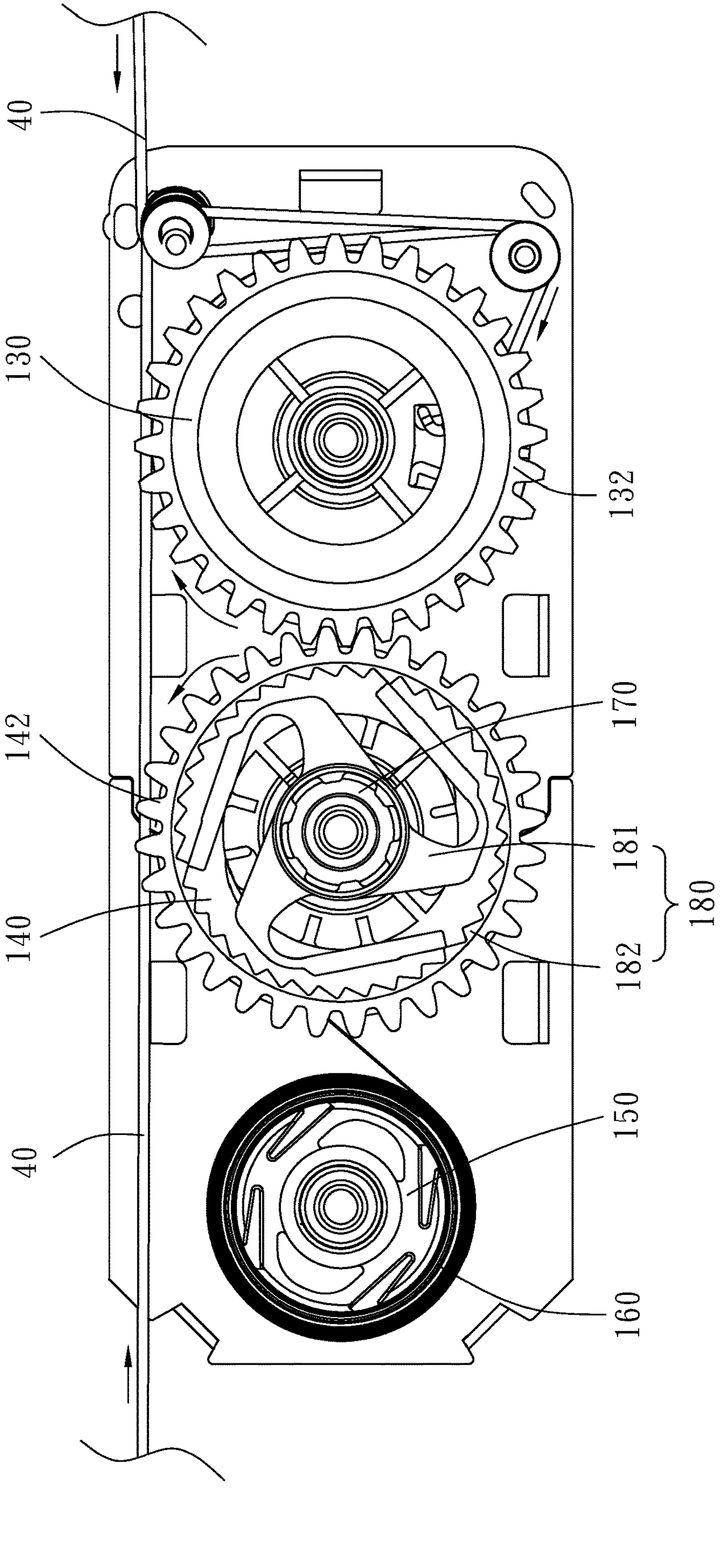
FIG. 12 is a bottom view of the cord retractor in FIG. 2 without part of the housing, illustrating the action of the cord retractor while the window covering is operated to be retracted.
Figure 13:
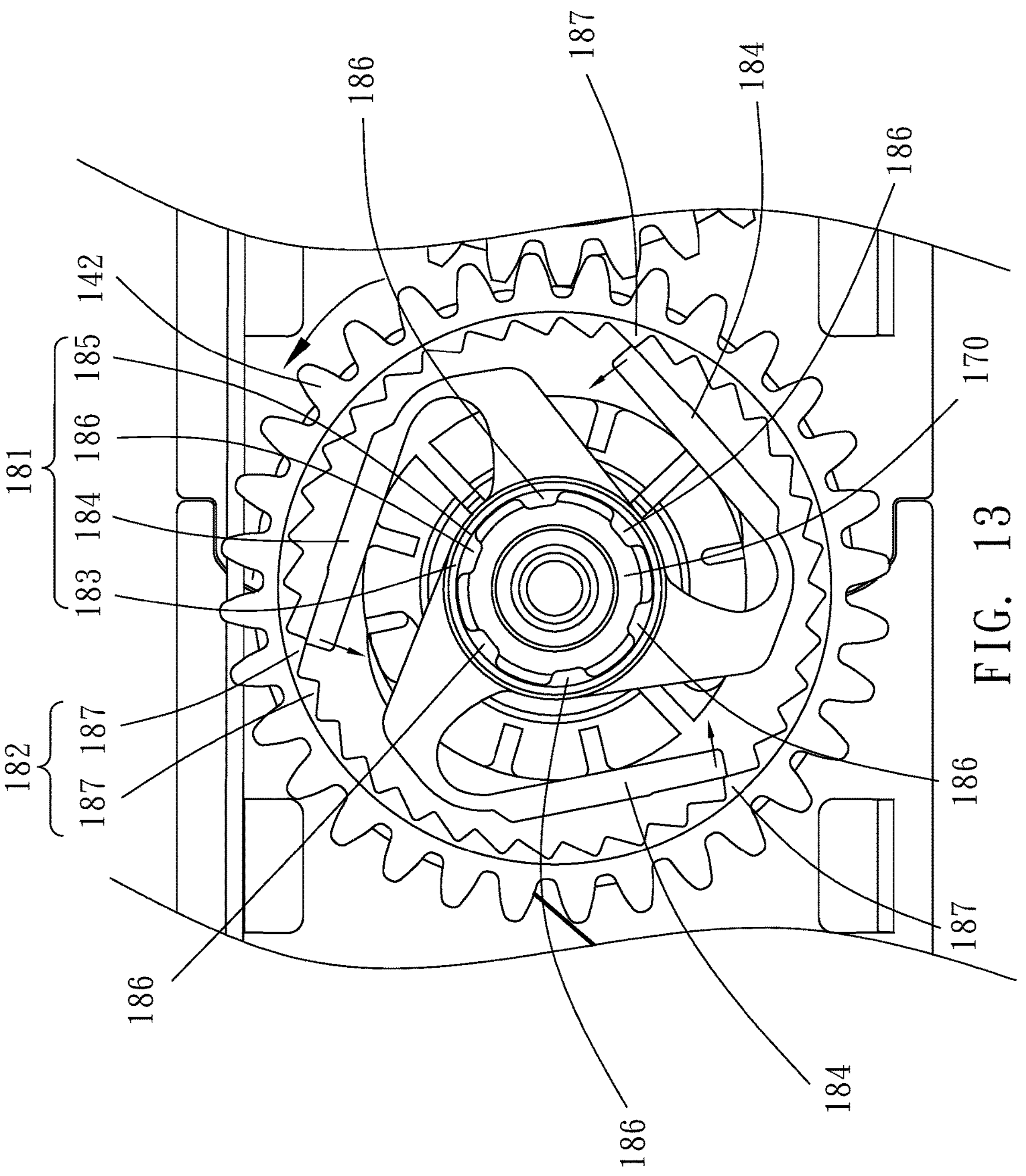
FIG. 13 is an enlarged view of the unidirectional transmission mechanism and the driving wheel in FIG. 12.

Referring to FIGS. 11 to 13, as the bottom plate 110 of the housing has been removed in FIG. 12 and FIG. 13 for clearly showing the interactions among the components of the cord retractor 100 while the window covering 1 is retracting. When the window covering 1 is operated to be retracted, the user pushes the bottom rail 30 up, in which an upward resultant force is applied to the bottom rail 30 and counteracts the downward force generated by the weight of the bottom rail 30 and the covering materials 20 stacked thereon. Therefore, the window covering 1 is out of balance, and the rewinding force stored in the spring 160 is released, which drives the driving wheel 140 to rotate reversely (in a rotating direction opposite to its rotating direction while the window covering 1 is extending). Moreover, the reeling wheel 130 engaged with the driving wheel 140 is driven to rotate. Thus, while pushing the bottom rail 30 up, the reeling wheel 130 rotates in a second direction which is opposite to the first direction, and keeps retracting the lift cords 40 and winding them on the wheel body 131. In this embodiment, the second direction is in a clockwise direction, as designated in FIG. 12. When the reeling wheel 130 rotates in the second direction to retract the lift cords 40, it also drives the driving wheel 140 to rotate reversely (e.g., in a counterclockwise direction). Since the second limiting member 182 moves together with the driving wheel 140, the second limiting member 182 rotates in the same direction with the driving wheel 140 (e.g., in a counterclockwise direction).

Please refer to FIG. 13, which is a partial enlarged view of FIG. 12. The second limiting member 182 rotates together with the driving wheel 140 in the counterclockwise direction with respect to the first limiting member 181. When the second limiting member 182 rotates to a position that each arm 184 of the first limiting member 181 is about to escape from the recess between the two neighboring ratchets 187, each arm 184 is pushed by the corresponding ratchet 187 and deformed, being in a second position as shown in FIG. 13.

When each arm 184 has skidded over the top of the corresponding ratchet 187, each arm 184 returns to the first position by its elasticity as shown in FIG. 10. Since the second limiting member 182 keeps rotating, the arms 184 are about to escape from the recess between the two neighboring ratchets 187 again, then repeating the process of being pushed by the corresponding ratchets 187 and deformed, skidding over the top of the corresponding ratchets 187, and returning to the first position. In other words, each arm 184 swings between the first position and the second position reciprocatedly. As a result, rather than driving the first limiting member 181 to rotate, the second limiting member 182 only skims over the first limiting member 181 when rotating counterclockwise with respect to the first limiting member 181. This status in which the second limiting member 182 and the first limiting member 181 do not rotate together is defined as a second operation mode hereinafter, and the direction which the second limiting member 182 rotates in is defined as an unlocking direction. When the second limiting member 182 rotates in the unlocking direction, the unidirectional transmission mechanism 180 is driven to operate in the second operation mode. In this embodiment, the unlocking direction of the second limiting member 182 is a counterclockwise direction.

When the unidirectional transmission mechanism 180 is in the second operation mode, the first limiting member 181 is not driven by the rotation of the driving wheel 140 and the second limiting member 182, which means the main body 183 of the first limiting member 181 has no tendency to rotate with respect to the friction member 170 or the possibility to drive the friction member 170 to rotate with respect to the second shaft 112. Hence, there is no relative rotation between the first limiting member 181 and the friction member 170, or between the first limiting member 181 and the second shaft 112. As a result, the force driving the rotation of the driving wheel 140 and the second limiting member 182 has no need to resist the first maximum static friction between the first limiting member 181 and the friction member 170 or the second maximum static friction between the friction member 170 and the second shaft 112. In the meantime, there is no slip friction between any two of the first limiting member 181, the friction member 170 and the second shaft 112. Therefore, while the window covering 1 is retracting, the friction member 170 does not provide resistance to the cord retractor 100, which saves labor by reducing the force required for lifting the bottom rail 30, and also ensures that the rewinding force provided by the spring 160 is effectively applied to the driving wheel 140 and the reeling wheel 130 as they rotate for retracing the lift cords 40.

When the user stops pushing the bottom rail 30 up and lets go of the bottom rail 30, a downward resultant force acts on the cord retractor 100 again due to the reason that the downward force generated by the weight of the bottom rail 30 and the covering materials 20 stacked thereon is greater than the rewinding force provided by the spring 160. Thus, the arms 184 of the first limiting member 181 return to the first position again as being engaged with the recess between two neighboring ratchets 187, as shown in FIG. 10. Meanwhile, the downward force generated by the weight of the bottom rail 30 and the covering materials 20 stacked thereon, the rewinding force provided by the spring 160, and the static friction correspondingly generated by the friction member 170 make a balance such that the bottom rail 30 is maintained in the current position and stays still.

Figure 14:
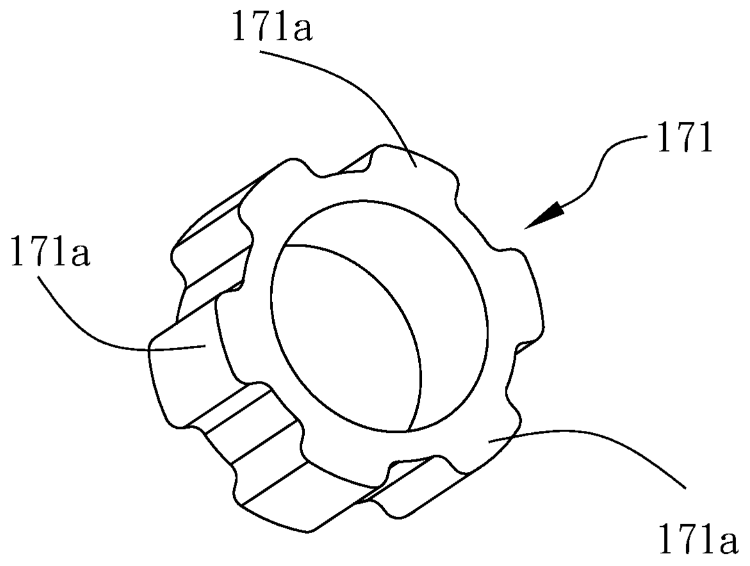
FIG. 14 is a perspective view of another exemplified friction member of the present disclose.
Figure 15:
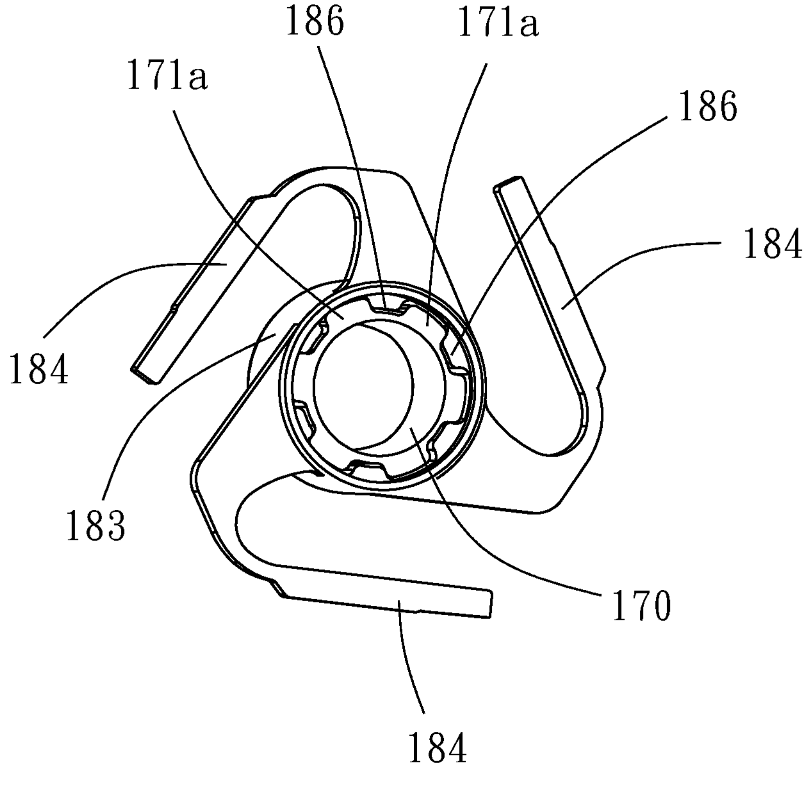
FIG. 15 is a perspective view of the combination of the first limiting member and the friction member in FIG. 14.

Please refer to FIG. 14 and FIG. 15, which show another exemplified friction member of the present disclosure. In this embodiment, the main body 183 of the first limiting member 181 comprises a first engaging portion on the inner wall 185 of the main body 183, e.g., the bumps 186. Meanwhile, the friction member 171 is in a closed loop shape and further comprises a second engaging portion, e.g., a plurality of protrusions 171*a*. The protrusions 171*a* are protruding outwardly from an outer wall of the friction member 171 and spaced apart from each other for engaging with the bumps 186 on the inner wall 185 of the first limiting member 181. Since each protrusion 171*a* is engaged with the recess between the two neighboring bumps 186, the friction member 171 rotates together or stays still together with the first limiting member 181. When the friction member 171 is sleeved on the second shaft 112 (as shown in FIG. 3), the contact surface between the friction member 171 and the second shaft 112 is in the form of a continuous uninterrupted loop. Moreover, an inside diameter of the friction member 171 does not change while the friction member 171 rubs against the second shaft 112. Therefore, the friction member 171 continuously and stably provides constant resistance to the cord retractor 100 while the window covering 1 is operated to be extended.

In a second preferred embodiment of the present disclosure, referring to FIGS. 16 to 19, the cord retractor 200 comprises a bottom plate 210 and an upper cover 220, as well as a reeling wheel 230, a driving wheel 240, a spring wheel 250, a spring 260, a friction member 270 and a unidirectional transmission mechanism 280 which are situated between the bottom plate 210 and the upper cover 220. The friction member 270 and the unidirectional transmission mechanism 280 are disposed within the reeling wheel 230.

Figure 16:
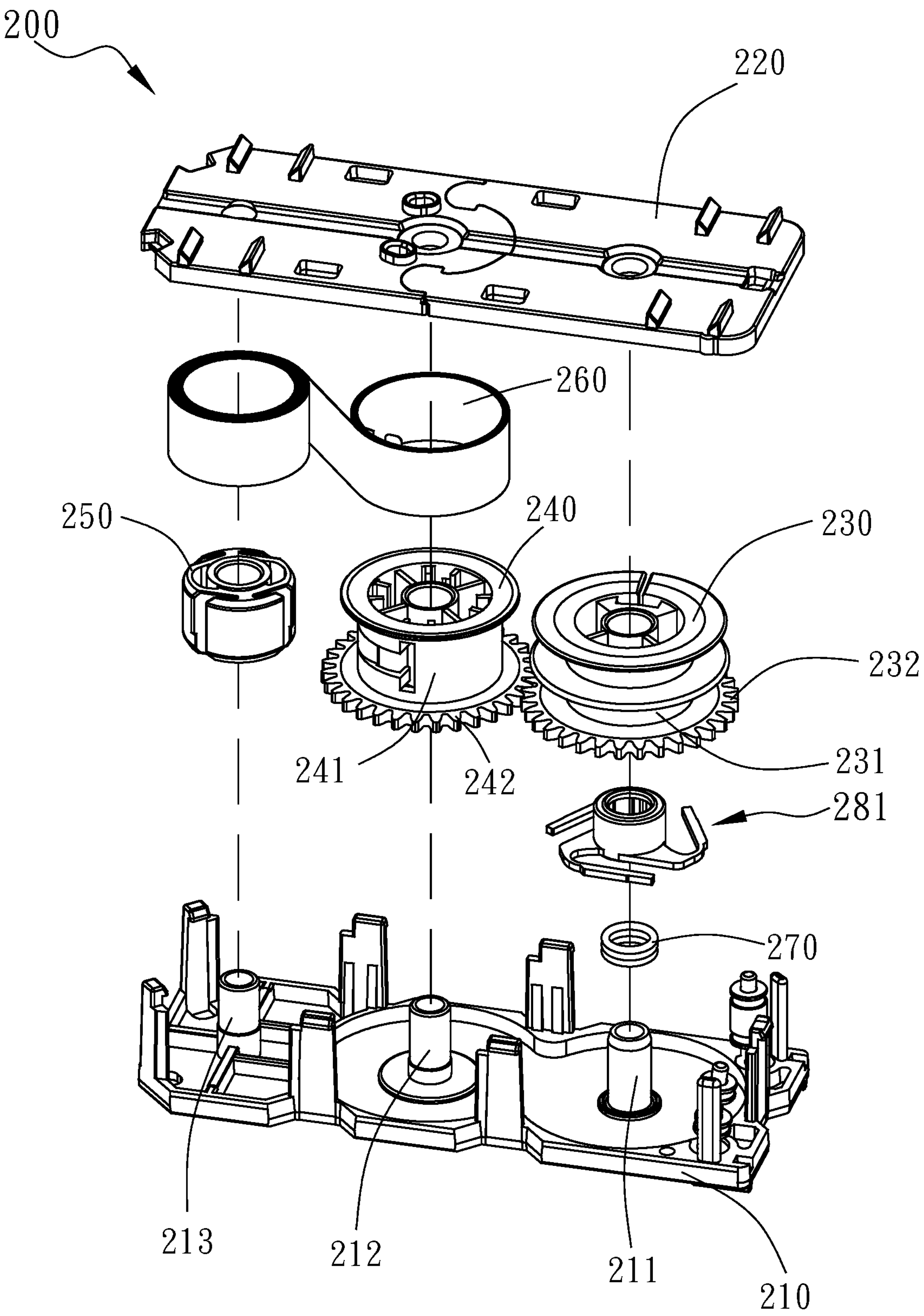
FIG. 16 is an exploded view of the cord retractor according to a second preferred embodiment of the preset disclosure.

As shown in FIG. 16, the reeling wheel 230, the driving wheel 240 and the spring wheel 250 are sleeved on the first shaft 211, the second shaft 212 and the third shaft 213, respectively. The reeling wheel 230 comprises a hollow body 231 and a reeling gear 232 disposed around the periphery of an end surface of the hollow body 231. The hollow body 231 is divided into an upper portion and a lower portion, and the two lift cords 40 are coupled with and wound on the upper portion and the lower portion, respectively.

The driving wheel 240 comprises a wheel body 241 and a driving gear 242. The wheel body 241 is sleeved on the second shaft 212. The driving gear 242 is disposed around the periphery of an end surface of the wheel body 241 and meshed with the reeling gear 232. The spring wheel 250 is sleeved on the third shaft 213. The spring 260 is a torsion spring having a first end and a second end, wherein the first end is coupled with and wound on the driving wheel 240, and the second end is coupled with and wound on the spring wheel 250. By such configurations, the reeling wheel 230 and the driving wheel 240 can drive each other to rotate correspondingly, and the spring wheel 250 can be driven by the driving wheel 240 to rotate by action of the spring 260. The friction member 270 is identical to the friction member 170 exemplified in FIG. 3 as comprising plural elastic O-shaped rings.

Figure 17:
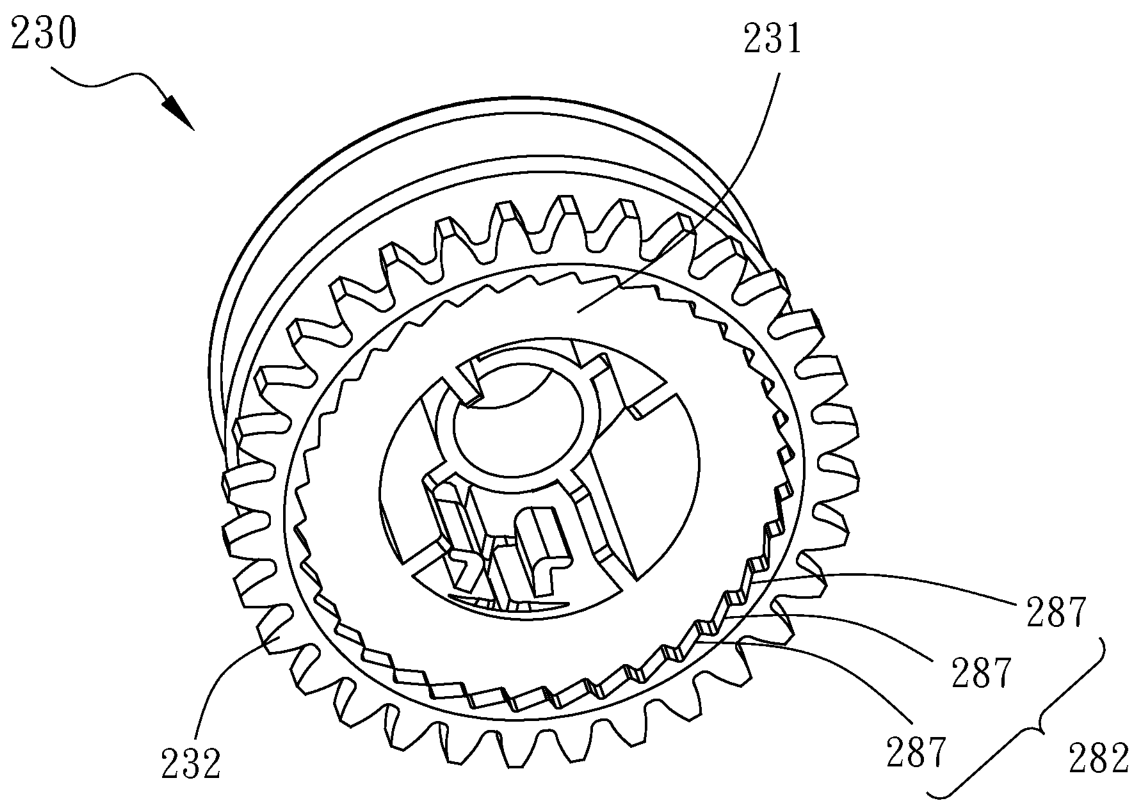
FIG. 17 is a perspective view of the combination of the reeling wheel and the second limiting member in FIG. 16.
Figure 18:
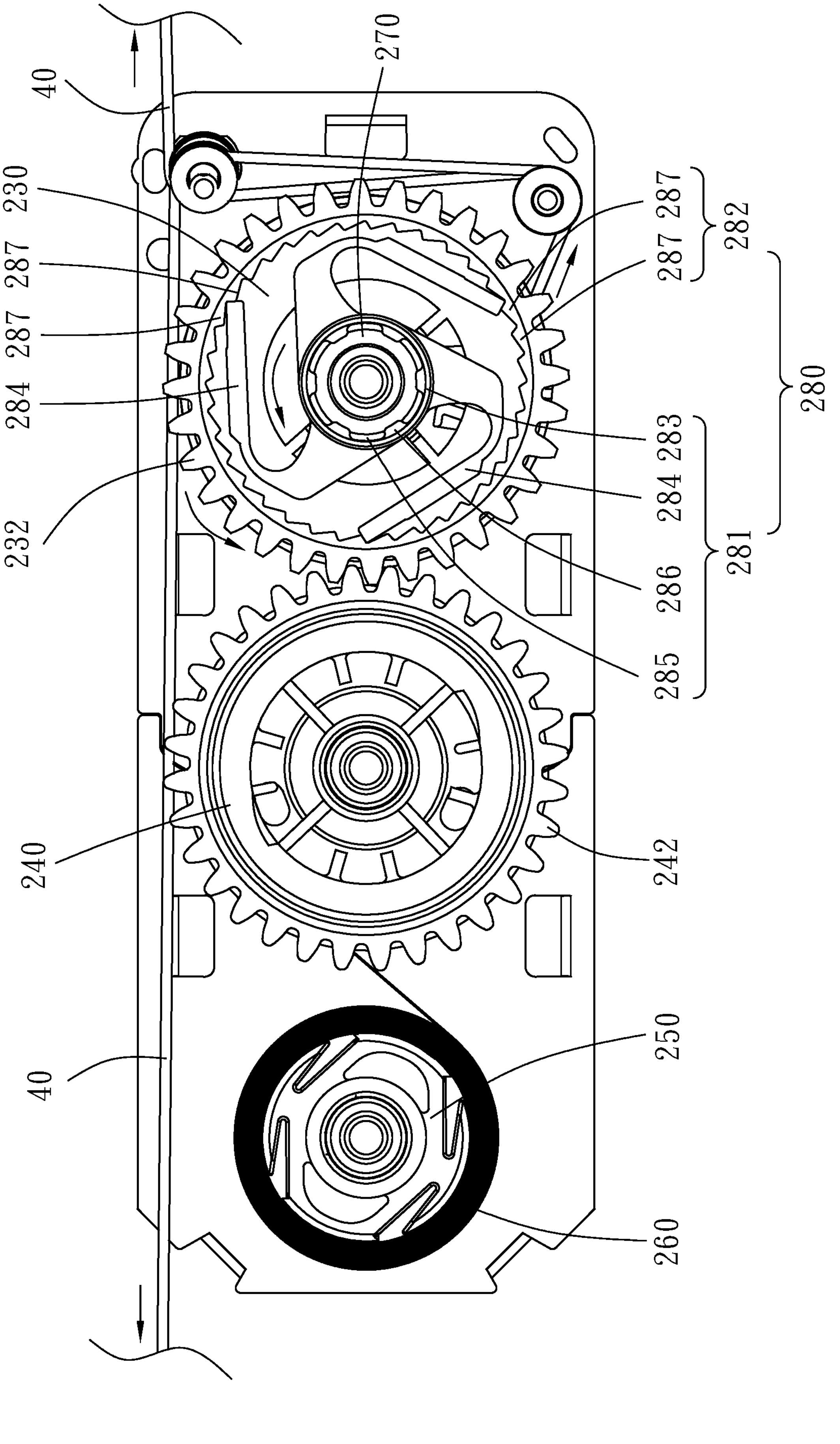
FIG. 18 is a bottom view of the cord retractor in FIG. 16 without the bottom plate of the housing, illustrating the action of the cord retractor while the window covering is operated to be extended.

As shown in FIGS. 16 to 18, the unidirectional transmission mechanism 280 comprises a first limiting member 281 and a second limiting member 282. The first limiting member 281 comprises a main body 283, plural arms 284 extending outwardly from the periphery of the main body 283, and plural bumps 286 situated on an inner wall 285 of the main body 283 for engaging with the friction member 270 to form a tight fit. As shown in FIG. 17, the second limiting member 282 is presented as an internal toothed ring gear having plural ratchets 287 integrally formed with an inner wall of the hollow body 231. When the reeling wheel 230 rotates, the second limiting member 282 rotates together with the reeling wheel 230.

In this embodiment, no matter where the window covering 1 is moved while extending or retracting, a rewinding force provided by the spring 260 to the lift cords 40 is set to be less than the downward force generated by the weight of the bottom rail 30 and the covering materials 20 stacked thereon. As a result, if there is no intervention of any other external force, the bottom rail 30 will descend and the lift cords 40 will be correspondingly released until the window covering 1 is completely extended.

Please refer to FIG. 18, in which the bottom plate 210 of the housing has been removed for clearly showing the interactions among the components of the cord retractor 200. When the window covering 1 is operated to be extended, the lift cords 40 drive the reeling wheel 230 to rotate in a first direction, which is counterclockwise as designated in FIG. 18. The second limiting member 282 also rotates counterclockwise as it moves together with the reeling wheel 230. When the second limiting member 282 rotates to a position that each arm 284 of the first limiting member 281 is engaged with the recess between the two neighboring ratchets 287, each arm 284 is in a first position as shown in FIG. 18, and the second limiting member 282 and the first limiting member 281 are inter-locked. In other words, the first limiting member 281 is driven to rotate together with the second limiting member 282 when the second limiting member 282 rotates. This status is referred to as the first operation mode. In the meantime, the counterclockwise direction of the second limiting member 282 is referred to as the locking direction.

When the first limiting member 281 rotates together with the second limiting member 282, the main body 283 drives the friction member 270 to rotate together, as the bumps 286 on the inner wall 285 are tightly fitted to the friction member 270. Since the friction member 270 continuously rubs against the first shaft 211, the friction member 270 continuously provides constant resistance to the cord retractor 200 for assisting the user in determining the moving speed and moving distance of the bottom rail 30 while the window covering 1 is operated to be extended. Furthermore, when the user lets go of the bottom rail 30, there is still a downward resultant force acting on the cord retractor 200, which is generated by the weight of the bottom rail 30 and the covering materials 20 stacked thereon minus the rewinding force provided by the spring 260. As so, the arms 284 of the first limiting member 281 are maintained in the first positions as being engaged with the recess of the two neighboring ratchets 287. Because the maximum static friction could be generated by the friction member 270 is set to be greater than the difference obtained by subtracting the rewinding force provided by the spring 260 from the downward force generated by the weight of the bottom rail 30 and the covering materials 20 stacked thereon, the bottom rail 30 is maintained in the current position after the user stops the operation.

Once the user drags down the bottom rail 30 again, the second limiting member 282 directly and instantly drives the first limiting member 281 to rotate. Thus, even if the user drags down the bottom rail 30 in an intermittent way, the friction member 270 accurately provides constant resistance to the cord retractor 200 every time the user starts dragging the bottom rail 30, which is carried out by the collaboration of the first limiting member 281 and the second limiting member 282 of the unidirectional transmission mechanism 280.

Figure 19:
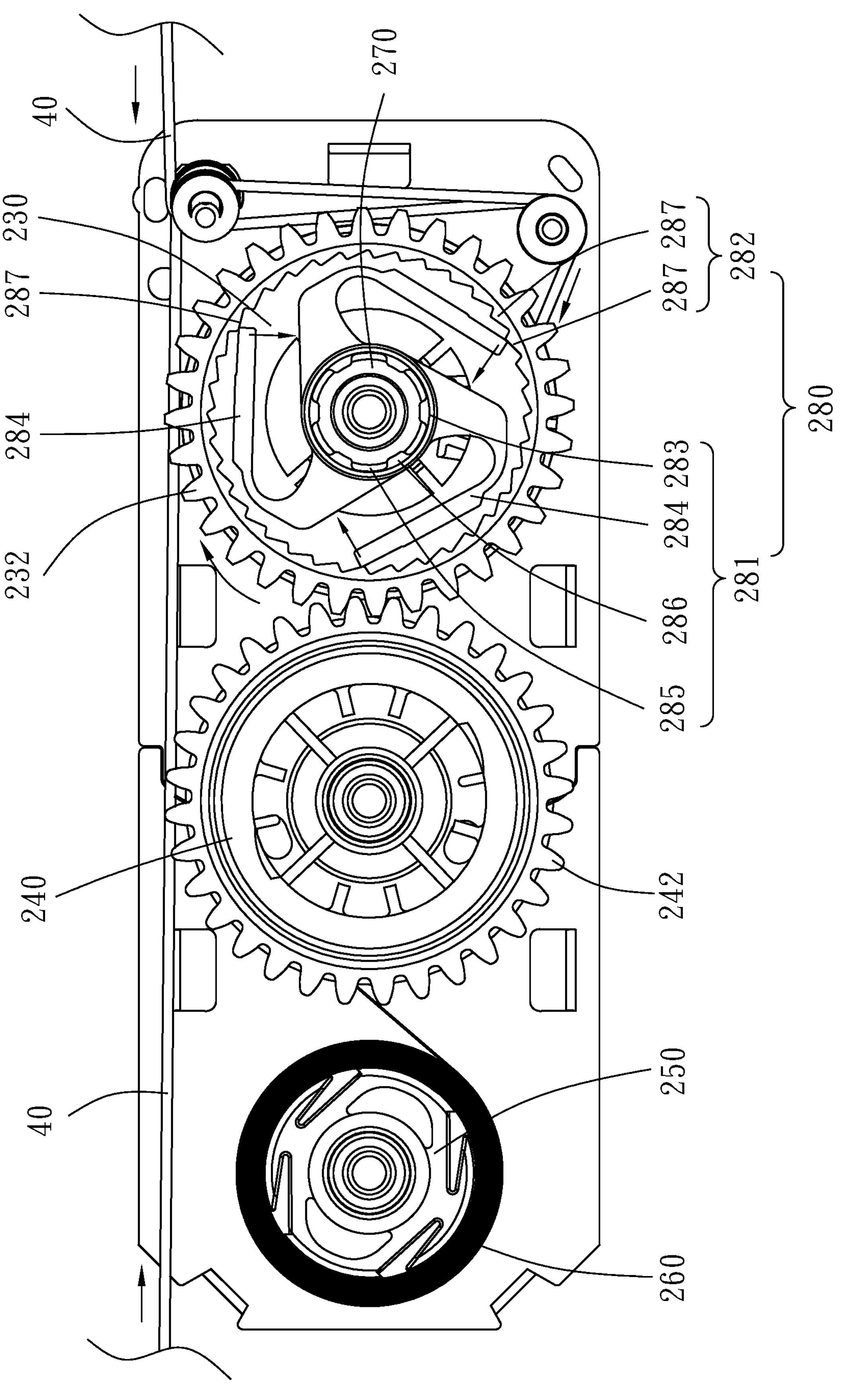
FIG. 19 is a bottom view of the cord retractor in FIG. 16 without the bottom plate of the housing, illustrating the action of the cord retractor while the window covering is operated to be retracted.

Referring to FIG. 19, as the bottom plate 210 of the housing has been removed for clearly showing the interactions among the components of the cord retractor 200 while the window covering 1 is operated to be retracted. When the window covering 1 is retracting, the reeling wheel 230 rotates in a second direction to retract the lift cords 40, which is opposite to the first direction and is clockwise as designated in FIG. 19. In the meantime, the second limiting member 282 also rotates clockwise as it moves together with the reeling wheel 230. When the second limiting member 282 rotates, each arm 284 of the first limiting member 281 swings to a second position as shown in FIG. 19, in which each arm 284 is about to escape from the recess between the two neighboring ratchets 287, being pushed by the corresponding ratchet 287 and deformed. Afterwards, each arm 284 of the first limiting member 281 skids over the top of the corresponding ratchet 287 and returns to the first position by its elasticity. Since the second limiting member 282 keeps rotating, the arms 284 repeat the process of being pushed by the ratchets 287 and deformed, skidding over the top of the corresponding ratchets 287, and returning to the first position. In other words, each arm 284 swings between the first position and the second position reciprocatedly. As a result, rather than driving the first limiting member 281 to rotate, the second limiting member 282 only skims over the first limiting member 281 when rotating clockwise with respect to the first limiting member 281. This status in which the second limiting member 282 and the first limiting member 281 do not rotate together is referred to as the second operation mode, and the clockwise direction of the second limiting member 282 is referred to as the unlocking direction. Since the first limiting member 281 does not rotate while the window covering 1 is operated to be retracted, there is no relative rotation between the first limiting member 281 and the friction member 270, or between the first limiting member 281 and the second shaft 212. Therefore, while the window covering 1 is operated to be retracted, the friction member 270 does not provide resistance to the cord retractor 200, which saves labor by reducing the force required for lifting the bottom rail 30, and also ensures that the rewinding force provided by the spring 260 is effectively applied to the driving wheel 240 and the reeling wheel 230 as they rotate for retracing the lift cords 40.

When the user stops pushing the bottom rail 30 up and lets go of the bottom rail 30, as described above, a downward resultant force acts on the cord retractor 200 again due to the reason that the downward force generated by the weight of the bottom rail 30 and the covering materials 20 stacked thereon is greater than the rewinding force provided by the spring 260. Thus, the arms 284 of the first limiting member 281 return to the first position again as being engaged with the recess between the two neighboring ratchets 287, as shown in FIG. 18. Meanwhile, the downward force generated by the weight of the bottom rail 30 and the covering materials 20 stacked thereon, the rewinding force provided by the spring 260, and the static friction correspondingly generated by the friction member 270 make a balance again to maintain the bottom rail 30 in the current position.

In a third preferred embodiment of the present disclosure, referring to FIGS. 20 to 23, the cord retractor 300 comprises a bottom plate 310 and an upper cover 320, and a reeling wheel 330, a driving wheel 340, a spring wheel 350, a spring 360, a friction member 370 and a unidirectional transmission mechanism 380 which are situated between the bottom plate 310 and the upper cover 320. There are a first shaft 311, a second shaft 312, a third shaft 313 and a fourth shaft 314 disposed on the bottom plate 310. Furthermore, the cord retractor 300 comprises a transmission wheel 390 sleeved on the fourth shaft 314, and the friction member 370 and the unidirectional transmission mechanism 380 are disposed within the transmission wheel 390.

Figure 20:
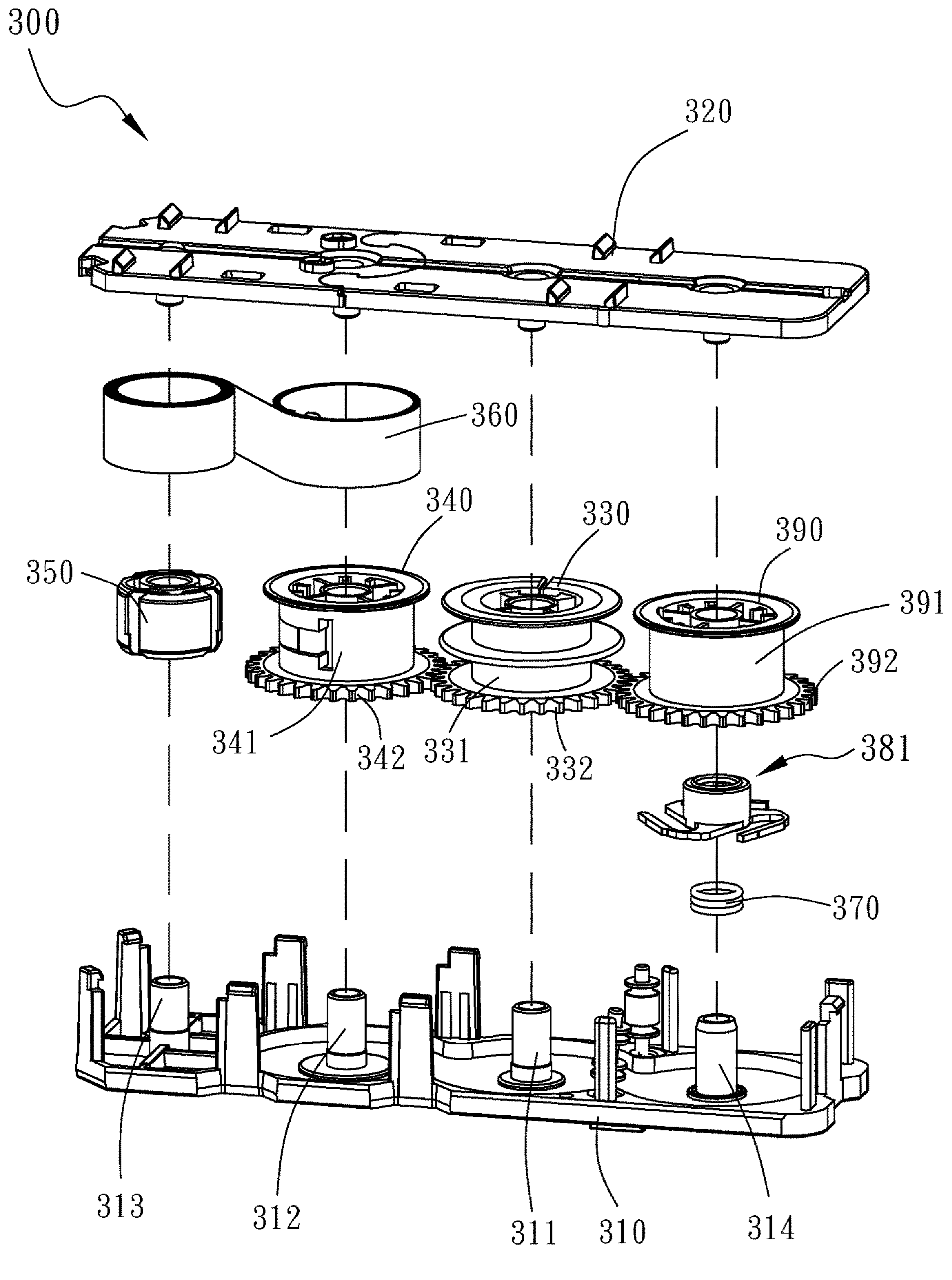
FIG. 20 is an exploded view of the cord retractor according to a third preferred embodiment of the preset disclosure.

As shown in FIG. 20, the transmission wheel 390, the reeling wheel 330, the driving wheel 340 and the spring wheel 350 are sleeved on the fourth shaft 314, the first shaft 311, the second shaft 312 and the third shaft 313, respectively. The reeling wheel 330 comprises a wheel body 331 and a reeling gear 332, wherein the wheel body 331 is sleeved on the first shaft 311, and the reeling gear 332 is disposed around the periphery of an end surface of the wheel body 331. The wheel body 331 is divided into an upper portion and a lower portion. The lift cords 40 are coupled with and wound on the upper portion and the lower portion, respectively.

The driving wheel 340 comprises a wheel body 341 a driving gear 342. The wheel body 341 is sleeved on the second shaft 312. The driving gear 342 is disposed around the periphery of an end surface of the wheel body 341 and meshed with the reeling gear 332. The spring wheel 350 is sleeved on the third shaft 313. The spring 360 is a torsion spring, the two ends of which is coupled with and wound on the driving wheel 340 and the spring wheel 350, respectively. The transmission wheel 390 comprises a hollow body 391 and a transmission gear 392. The transmission gear 392 is disposed around the periphery of an end surface of the hollow body 391 and meshed with the reeling gear 332. By such configurations, the transmission wheel 390, the reeling wheel 330 and the driving wheel 340 can rotate correspondingly, and the spring wheel 350 can be driven by the spring 360 to rotate with the driving wheel 340. The friction member 370 is in a closed loop shape and sleeved on the fourth shaft 314, and is exemplified by plural elastic O-shaped rings.

Figure 21:
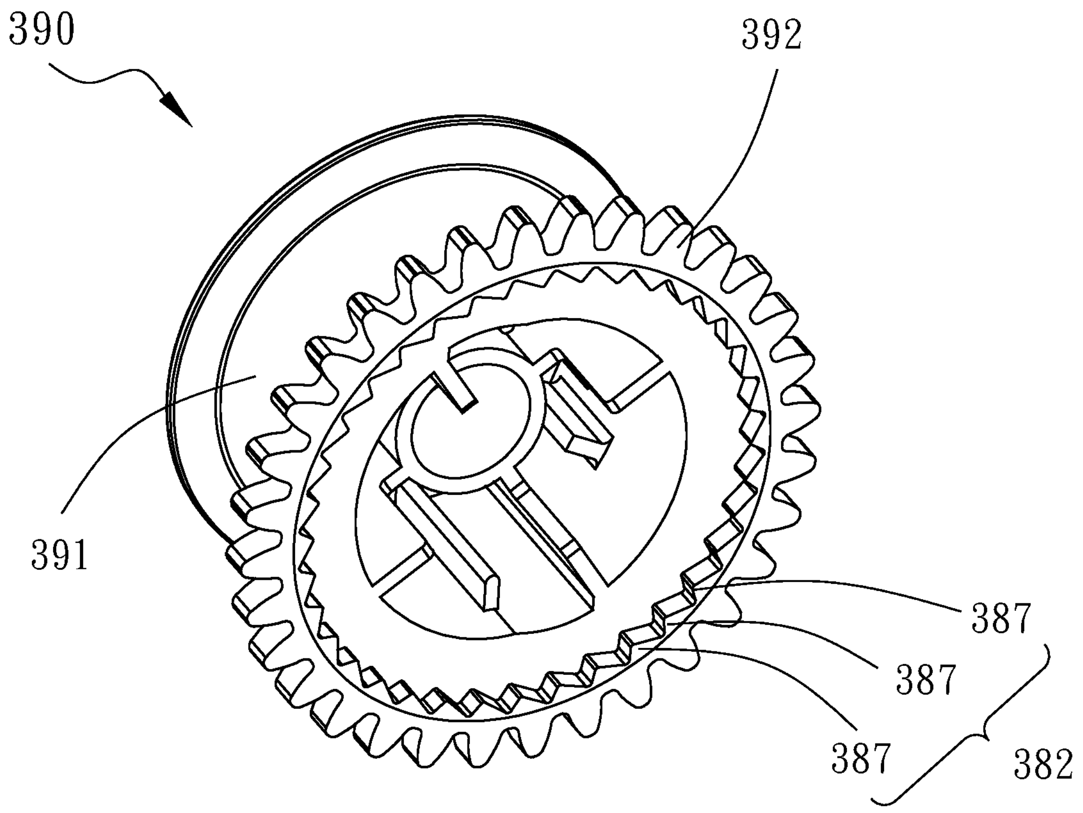
FIG. 21 is a perspective view of the combination of the transmission wheel and the second limiting member in FIG. 20.
Figure 22:
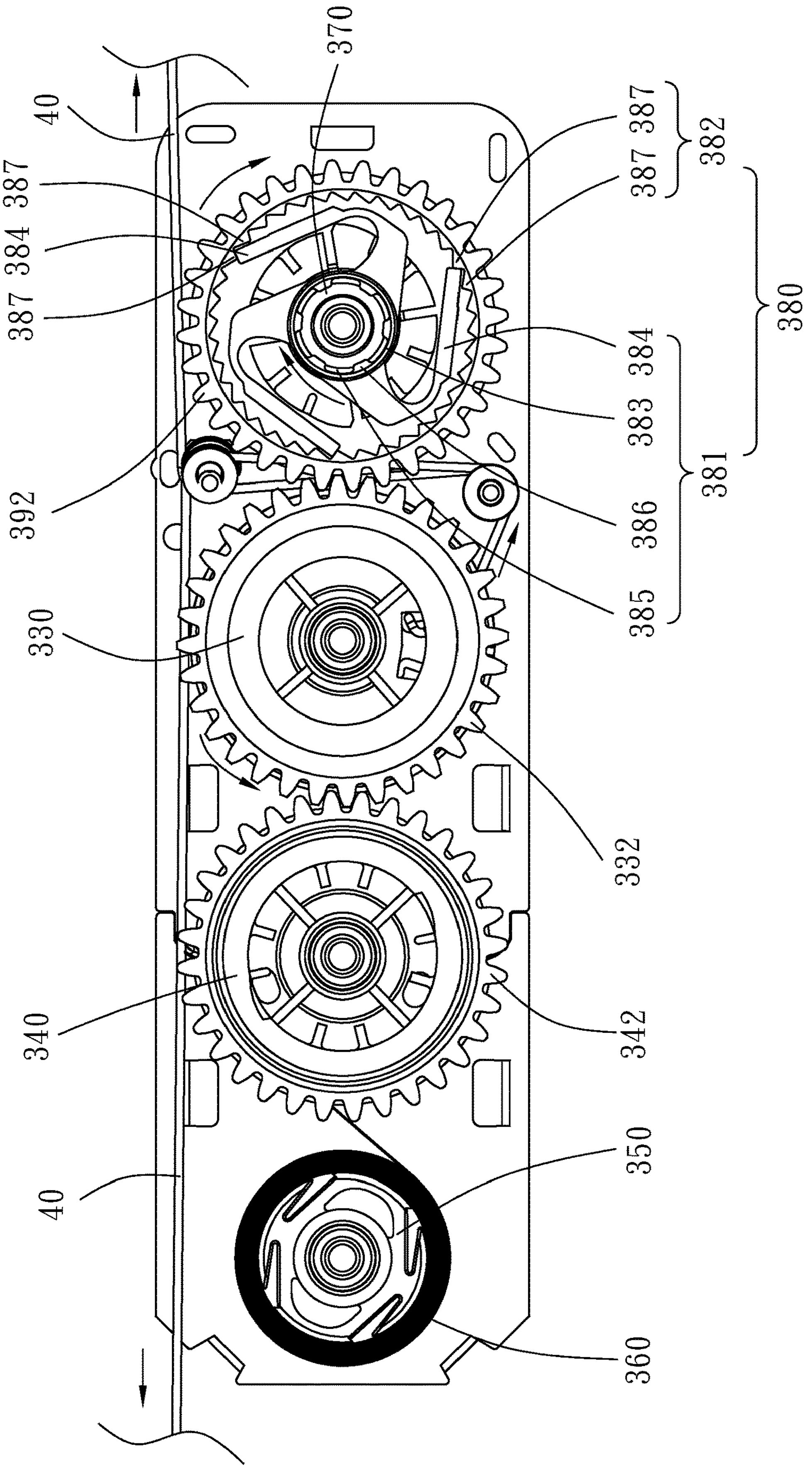
FIG. 22 is a bottom view of the cord retractor in FIG. 20 without the bottom plate of the housing, illustrating the action of the cord retractor while the window covering is operated to be extended.

Referring to FIGS. 20 to 22, the unidirectional transmission mechanism 380 comprises a first limiting member 381 and a second limiting member 382. The first limiting member 381 comprises a main body 383 and plural arms 384. The arms 384 are extending outwardly from the periphery of the main body 383 and made by an elastic material. Moreover, there are plural bumps 386 protruding from an inner wall 385 of the main body 383 for fitting tightly on and closely engaged with the friction member 370. The second limiting member 382 is in a form as an internal toothed ring gear having plural ratchets 387 integrally formed with an inner wall of the hollow body 391 of the transmission wheel 390, as shown in FIG. 21. Hence, the second limiting member 382 can rotate together with the transmission wheel 390 when the transmission wheel 390 rotates.

Please refer to FIG. 22, as the bottom plate 310 of the housing has been removed for clearly showing the interactions among the components of the cord retractor 300 while the window covering 1 is operated to be extended. When the user operates the window covering 1 to be extended, the lift cords 40 drive the reeling wheel 330 to rotate in a first direction, which is the counterclockwise direction in this embodiment, as designated in FIG. 22. The transmission wheel 390 engaged with the reeling wheel 330 thereby rotates clockwise, and the second limiting member 382 also rotates clockwise as it moves together with the transmission wheel 390. When the second limiting member 382 rotates to a position that each arm 384 of the first limiting member 381 is engaged with the recess between the two neighboring ratchets 387, each arm 384 is in a first position (as shown in FIG. 22), and the second limiting member 382 and the first limiting member 381 are operating in the first operation mode in which the second limiting member 382 and the first limiting member 381 are inter-locked and rotate together. In this embodiment, the clockwise direction of the second limiting member 382 is the locking direction.

While the first limiting member 381 rotates together with the second limiting member 382 in the clockwise direction, the main body 383 drives the friction member 370 to rotate together, through the bumps 386 on the inner wall 385. Therefore, the friction member 370 continuously rubs against the fourth shaft 314 and thereby continuously providing constant resistance to the cord retractor 300 while the window covering 1 is operated to be extended. In this embodiment, no matter where the window covering 1 is moved when being retracted or extended, the rewinding force provided by the spring 360 to the lift cords 40 is set to be less than the downward force generated by the weight of the bottom rail 30 and the covering materials 20 stacked thereon. As a result, if there is no intervention of any other external force, the bottom rail 30 will move downwardly and the lift cords 40 will be correspondingly released until the window covering 1 is completely extended. The constant resistance provided by the friction member 370, as mentioned above, helps the user to determine and control the moving speed and the moving distance while dragging down the bottom rail 30.

In addition, when the user lets go of the bottom rail 30 to stop dragging down the bottom rail 30, a force in the same direction with the force that user exerted on the bottom rail 30 while dragging down the bottom rail 30, is applied to the cord retractor 300, due to the weight of the bottom rail 30 and the covering materials 20 stacked thereon. Thus, the arms 384 of the first limiting member 381 are maintained in the first positions as being engaged with the recess of the two neighboring ratchets 387. Meanwhile, since the maximum static friction could be generated by the friction member 370 is set to be greater than the difference obtained by subtracting the rewinding force provided by the spring 360 from the downward force generated by the weight of the bottom rail 30 and the covering materials 20 stacked thereon, the bottom rail 30 is maintained in the current position after the user stops the operation.

Once the user drags down the bottom rail 30 again, the second limiting member 382 directly and instantly drives the first limiting member 381 to rotate. Thus, even if the user drags down the bottom rail 30 in an intermittent way, the friction member 370 accurately provides constant resistance to the cord retractor 300 every timer the user starts dragging the bottom rail 30, which is carried out in view of the collaboration of the first limiting member 381 and the second limiting member 382 of the unidirectional transmission mechanism 380.

Figure 23:
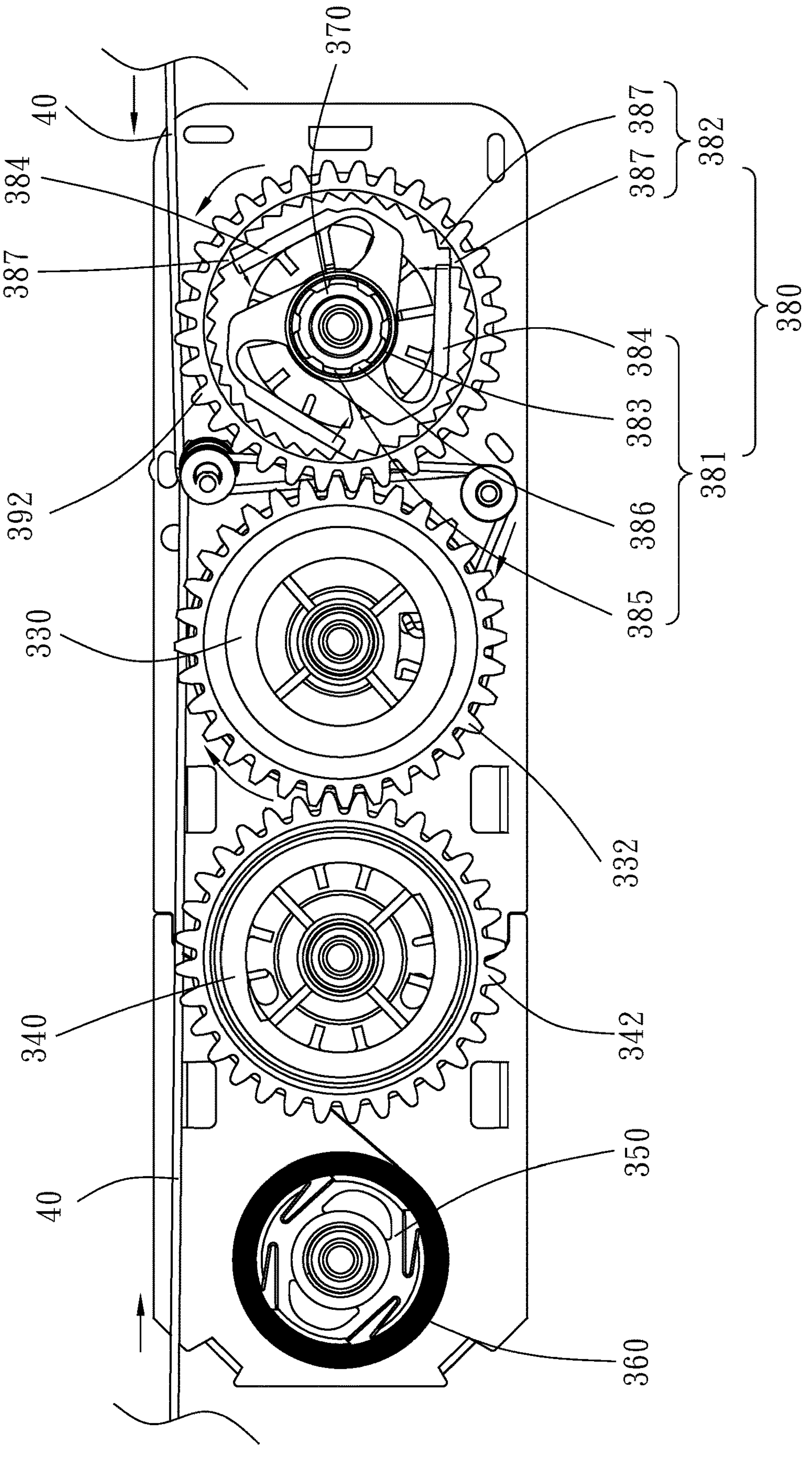
FIG. 23 is a bottom view of the cord retractor in FIG. 20 without the bottom plate of the housing, illustrating the action of the cord retractor while the window covering is operated to be retracted.
Figure 24:
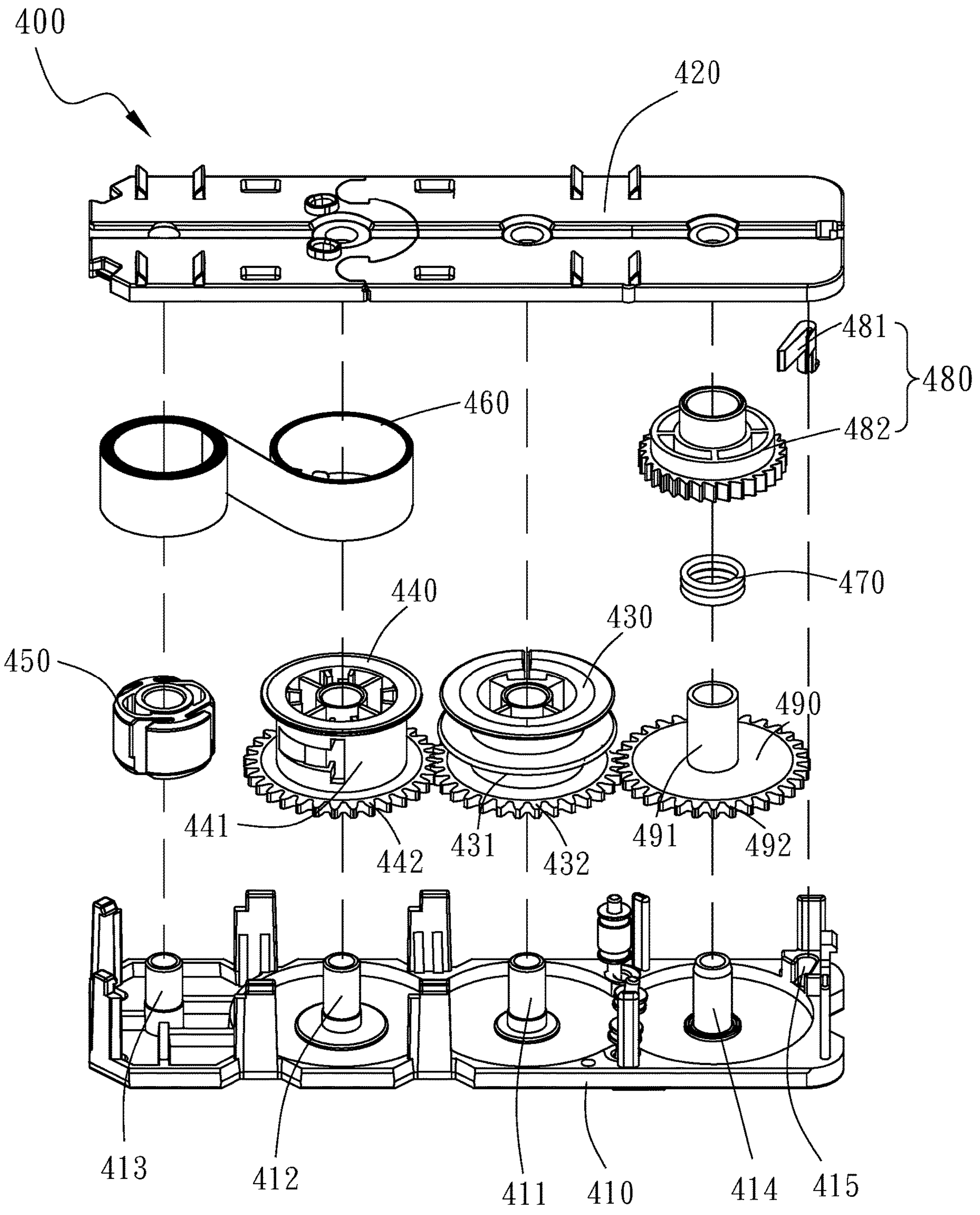
FIG. 24 is an exploded view of the cord retractor according to a fourth preferred embodiment of the preset disclosure.

Please refer to FIG. 23, as the bottom plate 310 of the housing has been removed for clearly showing the interactions among the components of the cord retractor 300 while the window covering 1 is operated to be retracted. When the window covering 1 is operated to be retracted, the reeling wheel 330 rotates in a second direction for retracting the lift cords 40. The second direction is opposite to the first direction. In this embodiment, the second direction is in a clockwise direction, as designated in FIG. 23. The transmission wheel 390 engaged with the reeling wheel 330 is driven to rotate counterclockwise, and the second limiting member 382 also rotates counterclockwise as it moves together with the transmission wheel 390. When the second limiting member 382 rotates, each arm 384 of the first limiting member 381 escapes from the recess between the two neighboring ratchets 387 and is pushed by the corresponding ratchet 387, being deformed and swinging to a second position, as shown in FIG. 23. Afterwards, each arm 384 of the first limiting member 381 skids over the top of the corresponding ratchet 387 and returns to the first position by its elasticity, as shown in FIG. 22. Since the second limiting member 382 keeps rotating, the arms 384 repeat the process of escaping from the recess between the two neighboring ratchets 387, being pushed by the corresponding ratchets 387 and deformed, and skidding over the top of the corresponding ratchets 387. In other words, each arm 384 reciprocatedly swings between the first position and the second position. As a result, rather than driving the first limiting member 381 to rotate, the second limiting member 382 only skims over the first limiting member 381 when rotating counterclockwise with respect to the first limiting member 381. This status in which the second limiting member 382 and the first limiting member 381 do not rotate together is referred to as the second operation mode, and the counterclockwise direction of the second limiting member 382 is referred to as the unlocking direction. Since the first limiting member 381 is not driven to rotate, the first limiting member 381 and the friction member 370 which is tightly fitted therewith will not rotate with respect to the fourth shaft 314. Therefore, while the window covering 1 is operated to be retracted, the friction member 370 does not provide resistance to the cord retractor 300, which saves labor by reducing the force required for lifting the bottom rail 30, and also ensures that the rewinding force provided by the spring 360 is effectively applied to the driving wheel 340 and the reeling wheel 330 as they rotate for retracing the lift cords 40.

When the user stops pushing the bottom rail 30 up and lets go of the bottom rail 30, a downward resultant force acts on the cord retractor 300 again due to the reason that the downward force generated by the weight of the bottom rail 30 and the covering materials 20 stacked thereon is greater than the rewinding force provided by the spring 360. Thus, the arms 384 of the first limiting member 381 return to the first positions again, in which the arms 384 are engaged with the recess between the two neighboring ratchets 387 as shown in FIG. 22. At this moment, the downward force generated by the weight of the bottom rail 30 and the covering materials 20 stacked thereon, the rewinding force provided by the spring 360, and the static friction correspondingly generated by the friction member 370 make a balance, such that the bottom rail 30 is maintained in the current position.

In a fourth preferred embodiment of the present disclosure, referring to FIGS. 24 to 30, the cord retractor 400 comprises a bottom plate 410 and an upper cover 420, and a reeling wheel 430, a driving wheel 440, a spring wheel 450, a spring 460, a friction member 470, a unidirectional transmission mechanism 480 and an intermediate wheel 490 which are situated between the bottom plate 410 and the upper cover 420. A first shaft 411, a second shaft 412, a third shaft 413, a fourth shaft 414 and a groove 415 are disposed on a first surface of the bottom plate 410. Compared with the unidirectional transmission mechanisms 180, 280 of the cord retractors 100, 200 in above-mentioned embodiments which are respectively disposed within the hollow body 141 of the driving wheel 140 and the hollow body 231 of the reeling wheel 230, the unidirectional transmission mechanism 480 in this embodiment is disposed outside of the intermediate wheel 490.

The intermediate wheel 490, the reeling wheel 430, the driving wheel 440 and the spring wheel 450 are sleeved on the fourth shaft 414, the first shaft 411, the second shaft 412 and the third shaft 413, respectively. The reeling wheel 430 comprises a wheel body 431 and a reeling gear 432. The wheel body 431 is sleeved on the first shaft 411 and is divided into an upper portion and a lower portion. The two lift cords 40 are coupled with and wound on the upper portion and the lower portion of the wheel body 431, respectively. The reeling gear 432 is disposed around the periphery of an end surface of the wheel body 431.

The driving wheel 440 comprises a wheel body 441 and a driving gear 442. The wheel body 441 is sleeved on the second shaft 412. The driving gear 442 is disposed around the periphery of an end surface of the wheel body 441 and meshed with the reeling gear 432. The spring wheel 450 is sleeved on the third shaft 413. The spring 460 is a torsion spring having a first end and a second end, wherein the first end is coupled with and wound on the driving wheel 440, and the second end is coupled with and wound on the spring wheel 450. The intermediate wheel 490 comprises a sleeve 491 and a transmission member 492. The sleeve 491 is sleeved on the fourth shaft 414, and the transmission member 492 is disposed around the periphery of the sleeve 491 and meshed with the reeling gear 432 of the reeling wheel 430. In such meshing configuration, the intermediate wheel 490, the reeling wheel 430 and the driving wheel 440 are driven to rotate correspondingly, and the spring wheel 450 is driven by the spring 460 to rotate correspondingly with the driving wheel 440. The friction member 470 is in a closed loop shape and sleeved on the sleeve 491 of the intermediate wheel 490. In this embodiment, the friction member 470 comprises plural elastic O-shaped rings, which are sleeved on and tightly fitted with the sleeve 491.

Figure 25:
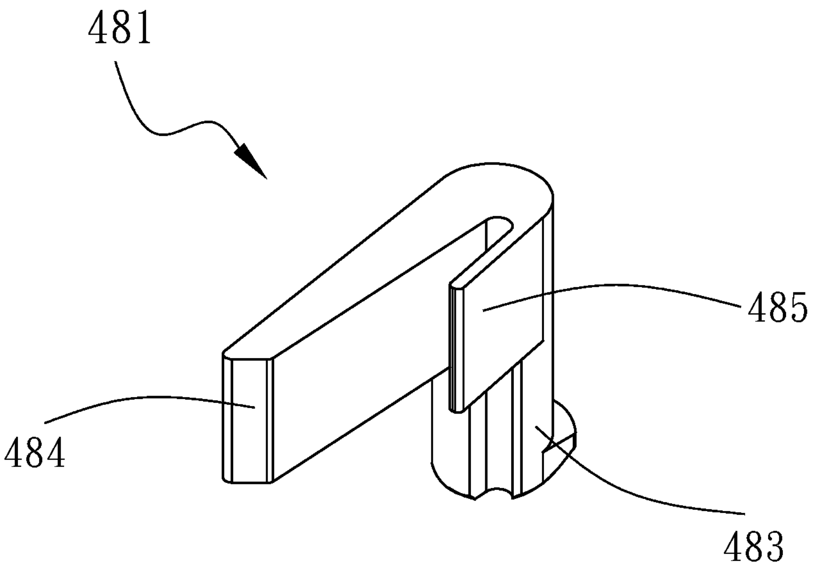
FIG. 25 is a perspective view of the first limiting member in FIG. 24.
Figure 26:
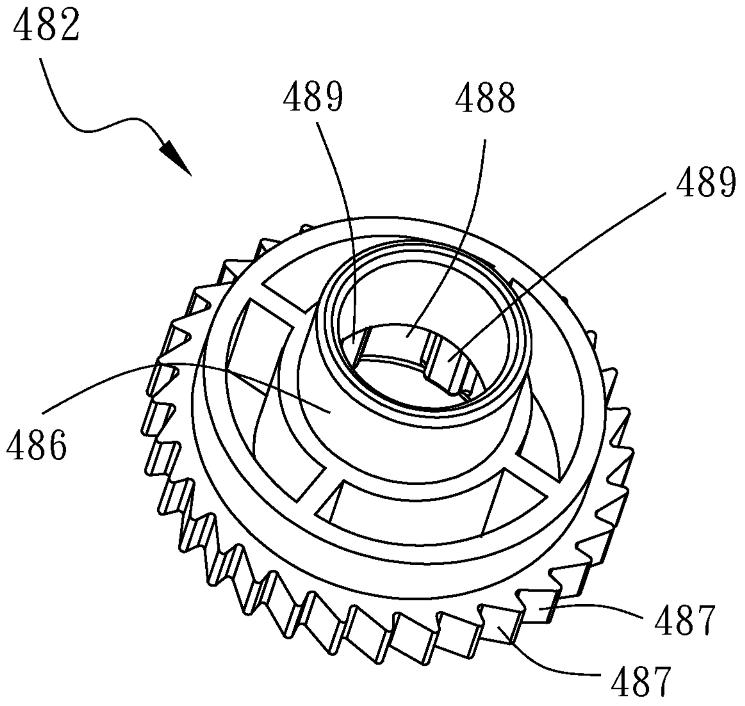
FIG. 26 is a perspective view of the second limiting member in FIG. 24.

Referring to FIGS. 24 to 28, the unidirectional transmission mechanism 480 comprises a first limiting member 481 and a second limiting member 482 which act collaboratively. The first limiting member 481 is disposed at the groove 415 on the bottom plate 410. The second limiting member 482 is disposed on the intermediate wheel 490. As shown in FIG. 25, the first limiting member 481 comprises a rod 483, an arm 484 and a recovering component 485. The arm 484 and the recovering component 485 are protruding from the rod 483 at different angles with respect to the rod 483. In other words, the arm 484 and the recovering component 485 extend towards the second limiting member 482 in the different directions. The recovering component 485 is elastic and deformable with respect to the rod 483. The rod 483 is rotatably inserted into and installed on the groove 415. The arm 484 protrudes out from the groove 415 for contact with the second limiting member 482. The recovering component 485 is abutting against an internal surface of the groove 415. As shown in FIG. 26, the second limiting member 482 comprises a main body 486 and plural ratchets 487 surrounding the outer periphery of the main body 486. In addition, there are plural bumps 489 protruding from an inner wall 488 of the main body 486.

Please refer to FIGS. 27 to 30, which show a completely assembled status of the cord retractor 400 and the interactions among the components of the cord retractor 400 while the window covering 1 is extending or retracting. After the friction member 470, the unidirectional transmission mechanism 480 and the intermediate wheel 490 have been assembled, the sleeve 491 of the intermediate wheel 490 is sleeved on the fourth shaft 414, and the friction member 470 is further sleeved on the outer peripheral surface of the sleeve 491. Furthermore, the main body 486 of the second limiting member 482 is sleeved on the friction member 470 and closely engaged with the friction member 470 by the plural bumps 489 on the inner wall 488 thereof, which forms a tight fit between the second limiting member 482 and the friction member 470. Meanwhile, the arm 484 of the first limiting member 481 is abutting against one of the ratchets 487 of the second limiting member 482.

In this embodiment, no matter where the window covering 1 is moved while extending or retracting, the rewinding force provided by the spring 460 to the lift cords 40 is set to be less than the downward force generated by the weight of the bottom rail 30 and the covering materials 20 stacked thereon. As a result, if there is no intervention of any other external force, the bottom rail 30 will descend and the lift cords 40 will be correspondingly released until the window covering 1 is completely extended.

Figure 27:
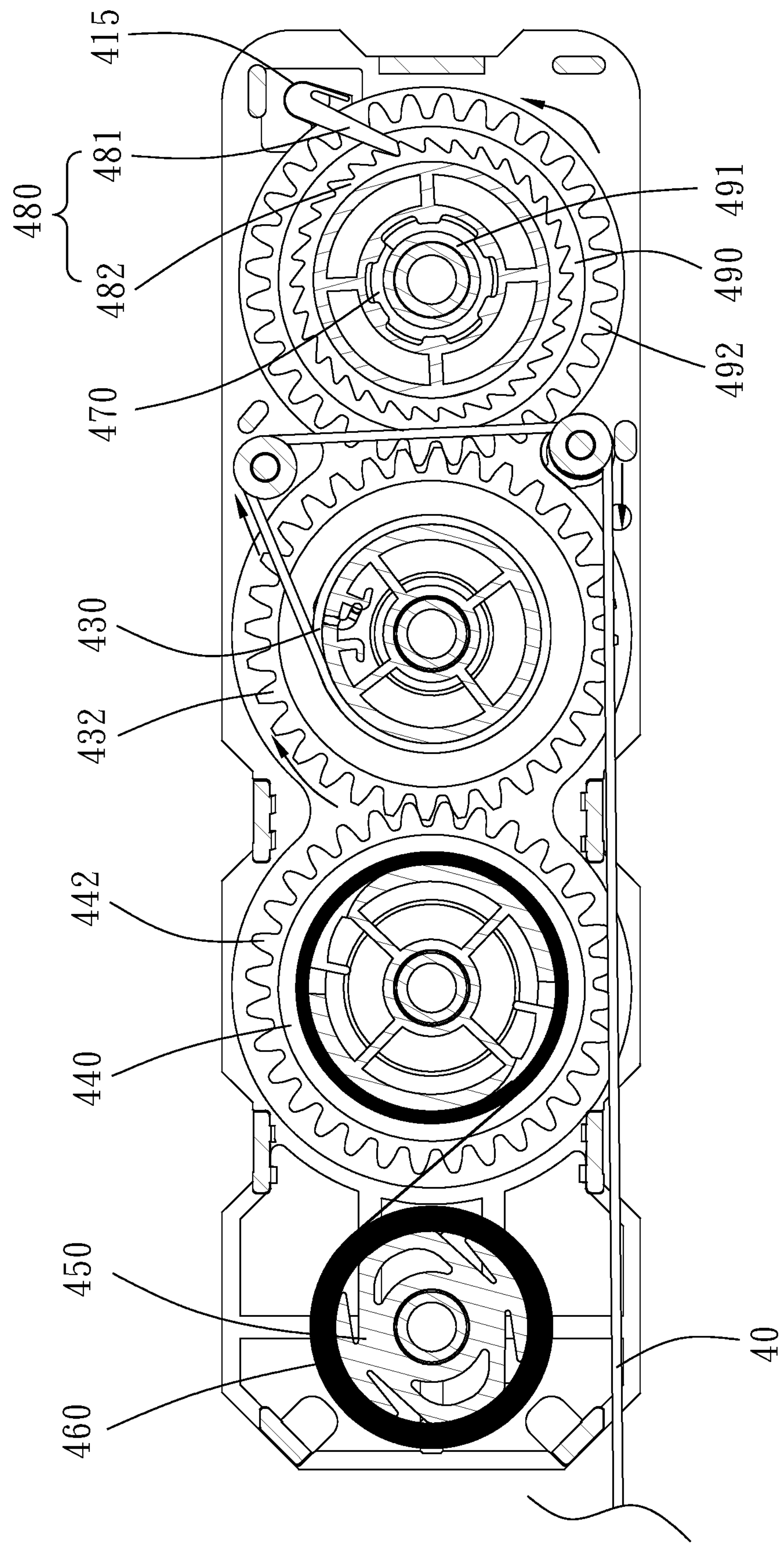
FIG. 27 is a cross sectional view of the cord retractor according to the fourth preferred embodiment of the preset disclosure, illustrating the action of the cord retractor while the window covering is operated to be extended.
Figure 28:
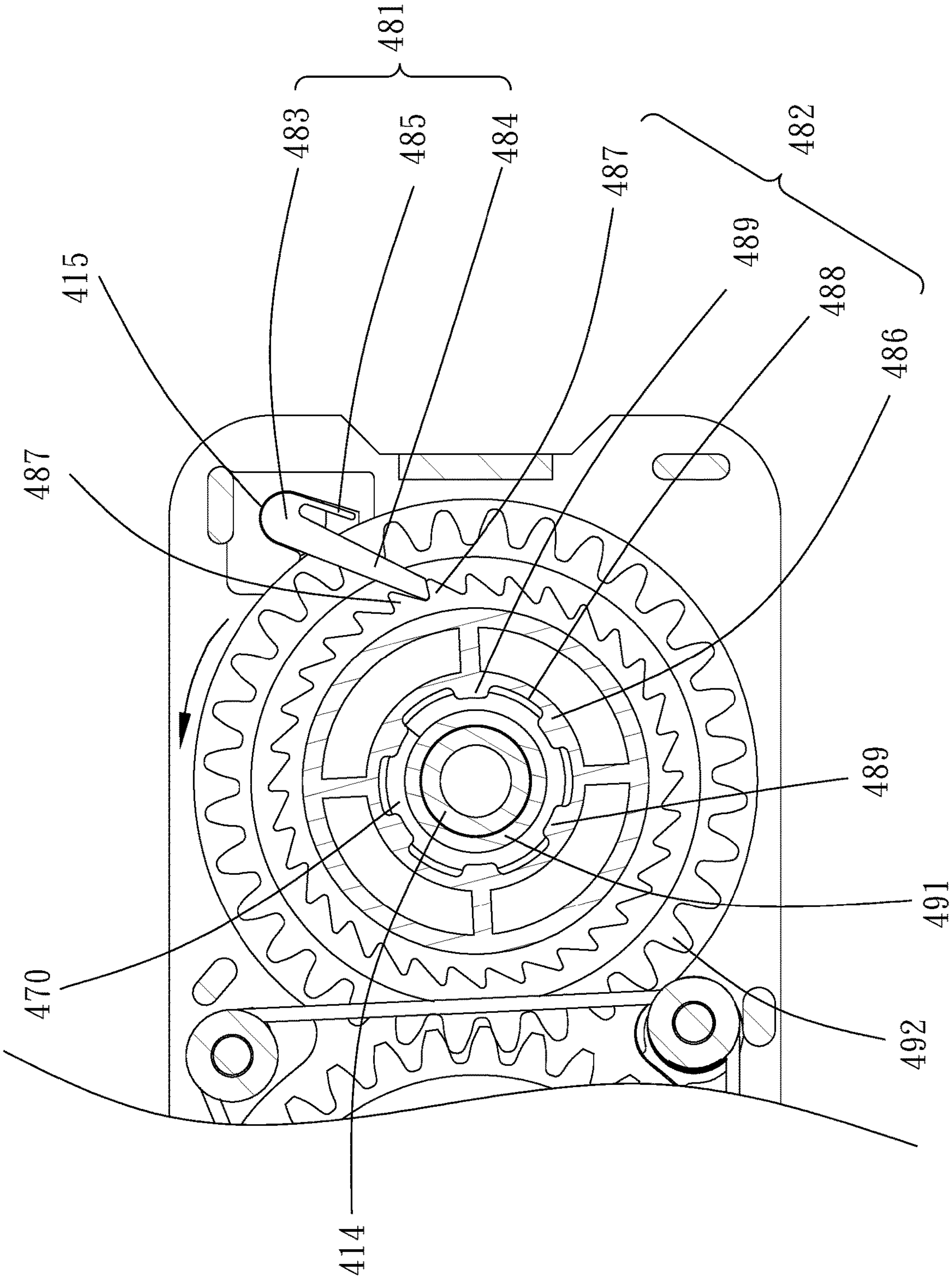
FIG. 28 is an enlarged view of the unidirectional transmission mechanism and the intermediate wheel in FIG. 27.

Please refer to FIGS. 27 and 28, which are the cross sectional views along a horizontal plane at the altitude of the recovering component 485 for clearly showing the interactions among the components of the cord retractor 400 while the window covering 1 is extending. When the window covering 1 is operated to be extended, the user drags down the bottom rail 30 and the lift cords 40 are correspondingly pulled, thereby driving the reeling wheel 430 to rotate in a first direction. In this embodiment, the first direction is a clockwise direction as designated in FIG. 27. As a result, the intermediate wheel 490 engaged with the reeling wheel 430 is driven to rotate counterclockwise. Since the sleeve 491 of the intermediate wheel 490 is tightly fitted with the friction member 470, and the friction member 470 is tightly fitted with the main body 486 of the second limiting member 482, the friction member 470 and the second limiting member 482 tend to rotate together with the intermediate wheel 490 in the counterclockwise direction.

Referring to FIG. 28, which is a partial enlarged view of FIG. 27, when the second limiting member 482 rotates to a position that the arm 484 of the first limiting member 481 is abutting against the recess between the two neighboring ratchets 487, the arm 484 is in a first position and restrains the second limiting member 482 from rotating. Such status in which the first limiting member 481 and the second limiting member 482 are inter-locked is referred to as the first operation mode. In this embodiment, the counterclockwise direction of the second limiting member 482 is the locking direction. When the second limiting member 482 rotates in the locking direction, the unidirectional transmission mechanism 480 is driven to operate in the first operation mode.

When the second limiting member 482 is blocked by the first limiting member 481 and stops rotating, the intermediate wheel 490 still keeps rotating. Thus, there is relative motion between the intermediate wheel 490 and the second limiting member 482. Because the second limiting member 482 is closely engaged with the friction member 470 through the bumps 489 on the inner wall 488 of the main body 486, a first maximum static friction between the second limiting member 482 and the friction member 470 is greater than a second maximum static friction between the friction member 470 and the sleeve 491. Therefore, once the driving force is greater than the second maximum static friction between the friction member 470 and the sleeve 491, the sleeve 491 of the intermediate wheel 490 starts rotating with respect to the friction member 470. While the intermediate wheel 490 rotates, the driving force has to resist the slip friction between the friction member 470 and the sleeve 491. Therefore, when the window covering 1 is extending, the sleeve 491 of the intermediate wheel 490 rubs against the friction member 470, as the contact surface between the friction member 470 and the sleeve 491 is in the form of a continuous uninterrupted closed loop. The friction member 470 continuously provides constant resistance to the cord retractor 400 for assisting the user in determining the moving speed and moving distance of the bottom rail 30, thereby preventing the bottom rail 30 from uncontrollably falling down.

In some other embodiments, the first maximum static friction between the second limiting member 482 and the friction member 470 is less than the second maximum static friction between the friction member 470 and the sleeve 491. Under this circumstance, once the driving force is greater than the first maximum static friction between the second limiting member 482 and the friction member 470, the intermediate wheel 490 drives the friction member 470 to rotate together with respect to the second limiting member 482. During the rotation, the driving force has to resist the slip friction between the second limiting member 482 and the friction member 470. Since the friction member 470 continuously rubs against the second limiting member 482, the friction member 470 continuously provides constant resistance to the cord retractor 400.

In more detail, while dragging down the bottom rail 30, the lift cords 40 drive the unidirectional transmission mechanism 480 to operate in the first operation mode. In other words, the second limiting member 482 has rotated to the position that the arm 484 of the first limiting member 481 is abutting against the recess between the two neighboring ratchets 487. In this circumstance, even if the user lets go of the bottom rail 30 to stop pulling down the bottom rail 30, there is still a downward resultant force acting on the cord retractor 400 due to the downward force generated by the weight of the bottom rail 30 and the covering materials 20 stacked thereon. Thus, the arm 484 of the first limiting member 481 is maintained abutting against the recess between the two neighboring ratchets 487. Moreover, the maximum static friction could be generated by the friction member 470 is set to be greater than the difference obtained by subtracting the rewinding force provided by the spring 460 from the downward force generated by the weight of the bottom rail 30 and the covering materials 20 stacked thereon, such that the bottom rail 30 is maintained in the current position after the user stops the operation.

Once the user drags down the bottom rail 30 again, the first limiting member 481 directly and immediately restrains the second limiting member 482 from rotating. Thus, even if the user drags down the bottom rail 30 in an intermittent way, the friction member 470 accurately provides constant resistance to the cord retractor 400 every time the user starts dragging the bottom rail 30, which is carried out in view of the collaboration of the first limiting member 481 and the second limiting member 482 of the unidirectional transmission mechanism 480.

Figure 29:
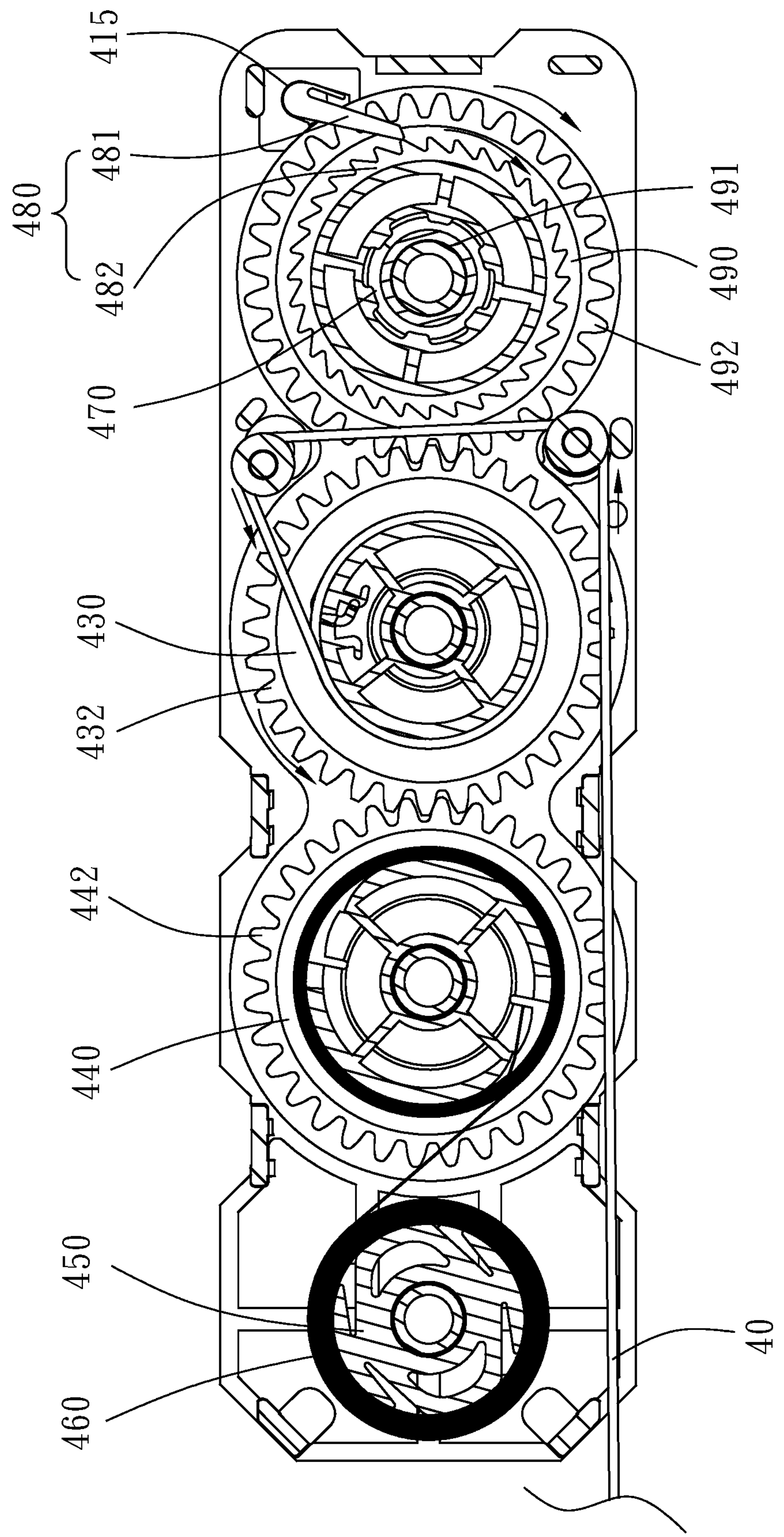
FIG. 29 is a cross sectional view of the cord retractor according to the fourth preferred embodiment of the preset disclosure, illustrating the action of the cord retractor while the window covering is operated to be retracted.
Figure 30:
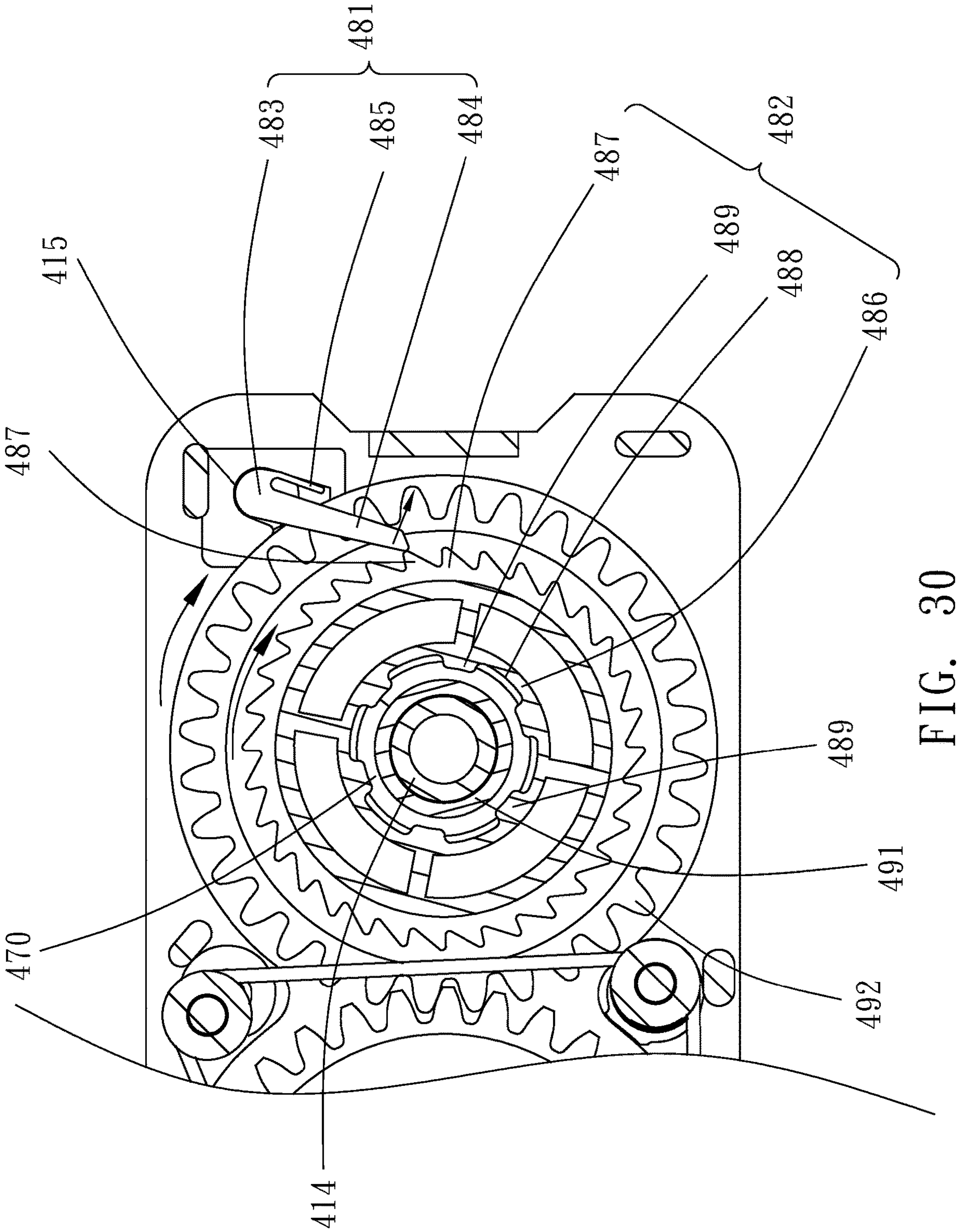
FIG. 30 is an enlarged view of the unidirectional transmission mechanism and the intermediate wheel in FIG. 29.

Please refer to FIGS. 29 and 30, which are the cross sectional views along a horizontal plane at the altitude of the recovering component 485 of the first limiting member 481 for clearly showing the interactions among the components of the cord retractor 400 while the window covering 1 is retracting. When the window covering 1 is operated to be retracted, the user pushes the bottom rail 30 up, and the reeling wheel 430 rotates in a second direction (designated as a counterclockwise direction in FIG. 29) opposite to the first direction for retracting the lift cords 40. The intermediate wheel 490 engaged with the reeling wheel 430 thereby rotates in a clockwise direction. When the intermediate wheel 490 rotates, both the friction member 470 sleeved on the intermediate wheel 490 and the second limiting member 482 rotate together with the intermediate wheel 490 in the clockwise direction.

Referring to FIG. 30, which is a partial enlarged view of FIG. 29, when the second limiting member 482 rotates to a position that the arm 484 of the first limiting member 481 has escaped from the recess between the two neighboring ratchets 487, the arm 484 is pushed by the corresponding ratchet 487 towards the recovering component 485 to be in a second position, in which an angle between the arm 484 and the recovering component 485 becomes smaller (compared with the angle therebetween when the arm 484 is in the first position). After the arm 484 skids over the top of the corresponding ratchet 487, the arm 484 returns to the first position (as shown in FIG. 28) as it is under the effect of an elastic recovery force provided by the recovering component 485. During the rotation of the second limiting member 482, the arm 484 repeat being pushed by the corresponding one of the ratchets 487 and deformed, skidding over the top of the corresponding one of the ratchets 487, and recovered to the previous position that the arm 484 is not being pushed yet. In other words, the arm 484 swings between the first position and the second position reciprocatedly. The status in which the second limiting member 482 rotates with respect to the first limiting member 481 is referred to as the second operation mode, and the clockwise direction of the second limiting member 482 is referred to as the unlocking direction. When the second limiting member 482 rotates in the unlocking direction, the unidirectional transmission mechanism 480 is driven to operate in the second operation mode.

In the second operation mode, the second limiting member 482 is not restrained by the first limiting member 481 and thereby rotates together with the intermediate wheel 490. As so, there is no relative motion among the sleeve 491 of the intermediate wheel 490, the friction member 470 and the main body 486 of the second limiting member 482. As a result, the driving force has no need to resist a first maximum static friction between the friction member 470 and the main body 486 of the second limiting member 482, or a second maximum static friction between the sleeve 491 and the friction member 470. In addition, the slip friction between any two of the sleeve 491, the friction member 470 and the main body 486 does not exist at this moment. Therefore, when the window covering 1 is retracting, the friction member 470 does not provide resistance to the cord retractor 400, which saves labor by reducing the force required for lifting the bottom rail 30, and also ensures that the rewinding force provided by the spring 460 is effectively applied to the driving wheel 440 and the reeling wheel 430 as they rotate for retracing the lift cords 40.

When the user stops pushing the bottom rail 30 up and lets go of the bottom rail 30, a downward resultant force acts on the cord retractor 400 again due to the reason that the downward force generated by the weight of the bottom rail 30 and the covering materials 20 stacked thereon is greater than the rewinding force provided by the spring 460. Thus, the arm 484 of the first limiting member 481 returns to the first position again, in which the arm 484 is engaged with the recess between two neighboring ratchets 487, as shown in FIG. 28. At this moment, the downward force generated by the weight of the bottom rail 30 and the covering materials 20 stacked thereon, the rewinding force provided by the spring 460, and the static friction correspondingly generated by the friction member 470 make a balance such that the bottom rail 30 is maintained in the current position.

In a fifth preferred embodiment of the present disclosure, referring to FIGS. 31 to 38, the cord retractor 500 comprises a bottom plate 510 and an upper cover 520, and a reeling wheel 530, a driving wheel 540, a spring wheel 550, a spring 560, a friction member 570 and a unidirectional transmission mechanism 580 disposed between the bottom plate 510 and the upper cover 520. The difference between the cord retractor 500 and the other exemplified cord retractors 100, 200, 300 and 400 in above-mentioned embodiments is mainly presented on the unidirectional transmission mechanism 580.

Figure 31:
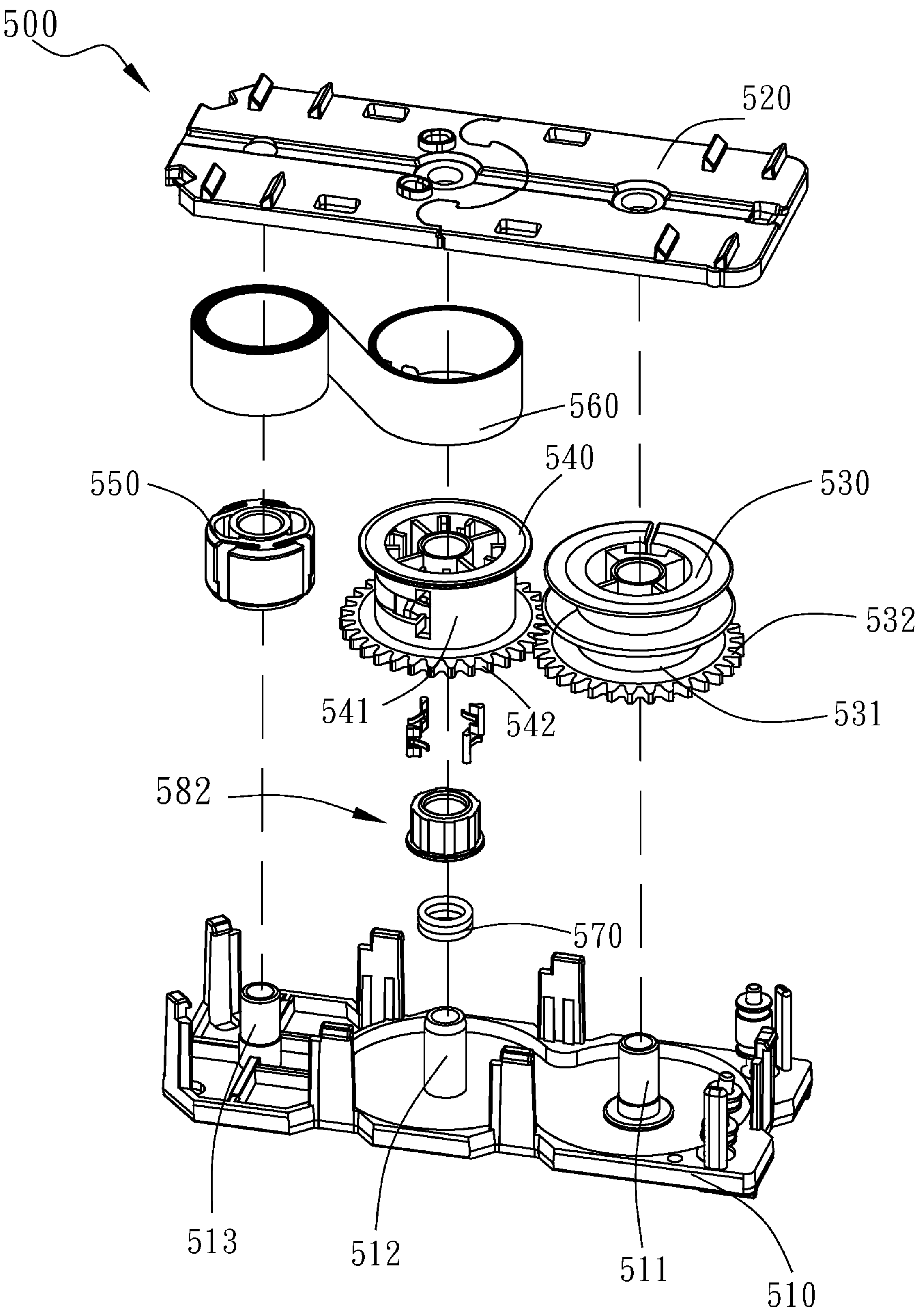
FIG. 31 is an exploded view of the cord retractor according to a fifth preferred embodiment of the preset disclosure.

Referring to FIG. 31, the reeling wheel 530, the driving wheel 540 and the spring wheel 550 are sleeved on the first shaft 511, the second shaft 512 and the third shaft 513, respectively. The reeling wheel 530 comprises a wheel body 531 and a reeling gear 532. The wheel body 531 is sleeved on the first shaft 511 and is divided into an upper portion and a lower portion. The two lift cords 40 are coupled with and wound on the upper portion and the lower portion of the wheel body 531, respectively. The reeling gear 532 is disposed around the periphery of an end surface of the wheel body 531.

The driving wheel 540 comprising a hollow body 541 and a driving gear 542. The hollow body 541 is sleeved on the second shaft 512. The driving gear 542 is disposed around the periphery of an end surface of the hollow body 541 and meshed with the reeling gear 532. The spring wheel 550 is sleeved on the third shaft 513. The spring 560 is a torsion spring having a first end and a second end, wherein the first end is coupled with and wound on the driving wheel 540, and the second end is coupled with and wound on the spring wheel 550. By such configuration, the reeling wheel 530 and the driving wheel 540 can drive each other to rotate and rotate synchronously. The spring wheel 550 is driven by the spring 560 to rotate correspondingly with the driving wheel 540. The friction member 570 is in a closed loop shape and sleeved on the second shaft 512. In this embodiment, the friction member 570 comprises plural elastic O-shaped rings, which are sleeved on and tightly fitted with the second shaft 512.

Figure 32:
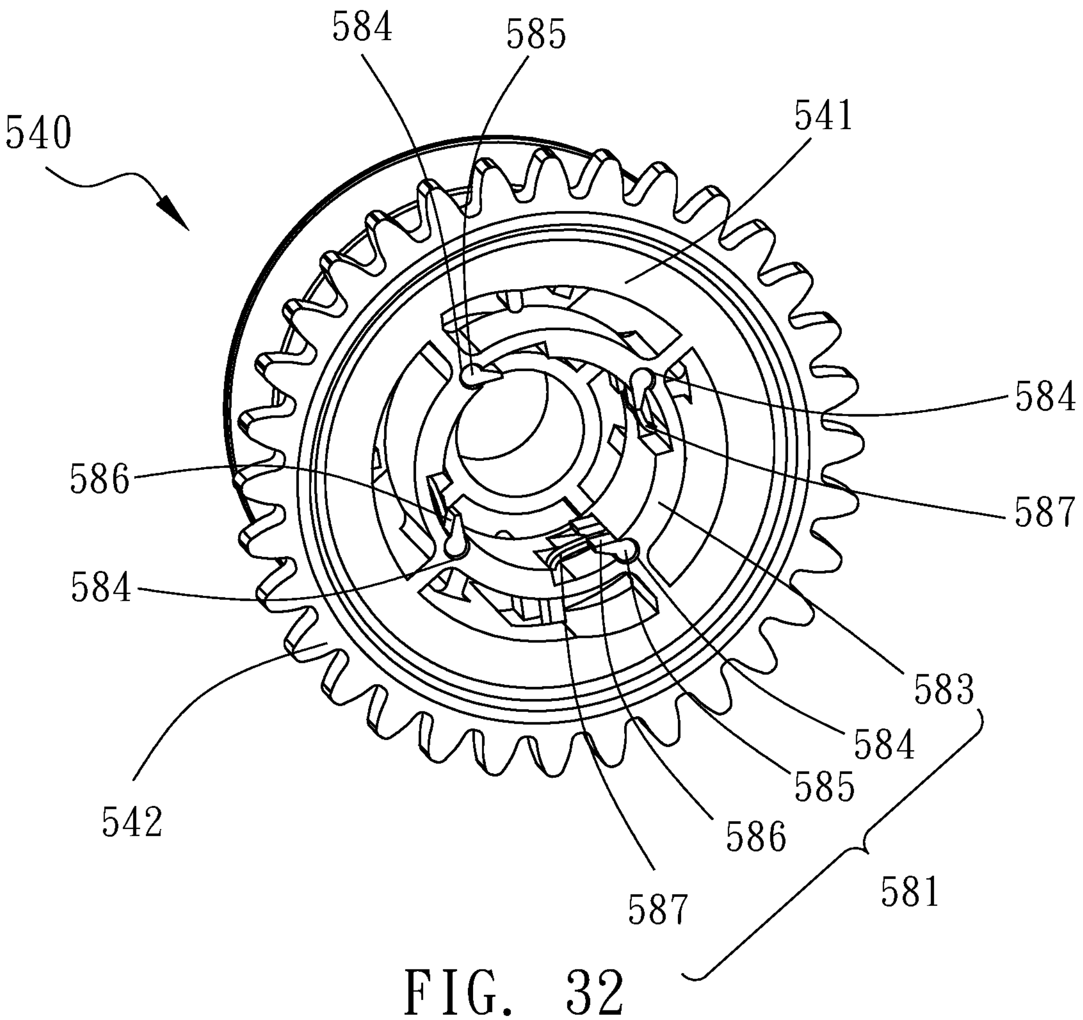
FIG. 32 is a perspective view of the combination of the driving wheel and the first limiting member in FIG. 31.
Figure 33:
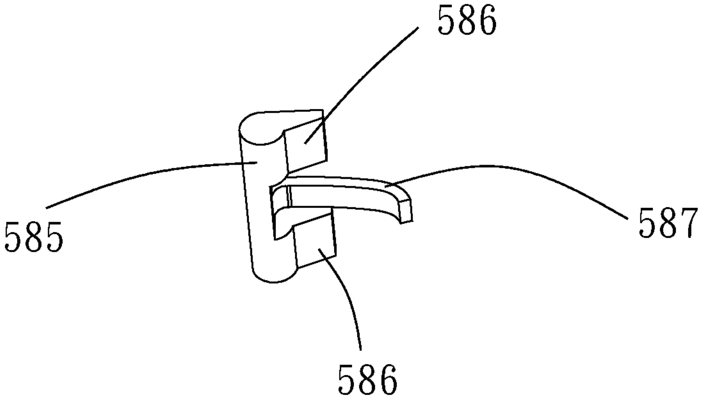
FIG. 33 is a perspective view of the swing element of the first limiting member in FIG. 32.
Figure 34:
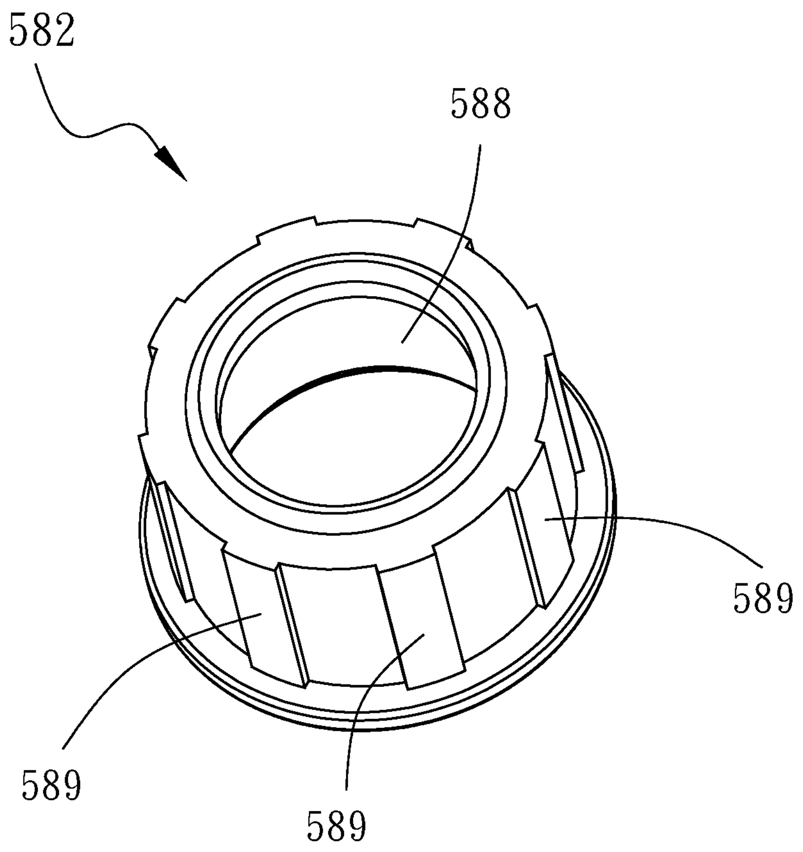
FIG. 34 is a perspective view of the second limiting member in FIG. 31.

Referring to FIGS. 31 to 35, the unidirectional transmission mechanism 580 is disposed within the driving wheel 540 and comprises a first limiting member 581 and a second limiting member 582. The first limiting member 581 has a hollow cylinder 583 and four swing elements, wherein the inner wall of the hollow cylinder 583 is provided with four grooves 584 for containing the four swing elements, respectively. As shown in FIG. 33, each swing element comprises a rod 585, two arms 586 and a recovering component 587. The two arms 586 are extending outwardly from the rod 585, and the recovering component 587 is situated in between the two arms 586. Moreover, the recovering component 587 is elastic and extending in a direction different from the extending direction of the arms 586. The rod 585 is rotatably inserted into and installed on the groove 584, the arms 586 protrudes out from the groove 584 for contact with the second limiting member 582, and one end of the recovering component 587 is abutting against an inner wall of the groove 584. In this embodiment, as shown in FIG. 32, the hollow cylinder 583 of the first limiting member 581 is integrally formed with an inner wall of the hollow body 541 of the driving wheel 540 for rotating together with the driving wheel 540. In some other embodiments, the first limiting member 581 is an independent component and the hollow body 541 of the driving wheel 540 is sleeved on and fixedly coupled with the first limiting member 581, by which the first limiting member 581 and the driving wheel 540 also can rotate together. Furthermore, in still some other embodiments, the wheel body 531 of the reeling wheel 530 is hollow, and the hollow cylinder 583 of the first limiting member 581 is fixedly situated on an inner wall of the hollow wheel body 531, in the manner of being integrally formed or assembled thereto, such that the hollow cylinder 583 of the first limiting member 581 can be driven by the reeling wheel 530 to rotate. The second limiting member 582 is sleeved on and tightly fitted with the friction member 570 by an inner wall 588 thereof. Moreover, the second limiting member 582 comprises plural ribs 589 arranged circularly on an outer peripheral wall thereof and arranged in equally spaced apart.

Please refer to FIGS. 35 to 38, which illustrate the cord retractor 500 in completely assembled status and the interactions among the components of the cord retractor 500 when the window covering 1 is extending or retracting. After the friction member 570 and the unidirectional transmission mechanism 580 have been installed within the driving wheel 540, the friction member 570 is sleeved on the second shaft 512, the second limiting member 582 is sleeved on and tightly fitted with the friction member 570, and each arm 586 extending out from the groove 584 of the hollow cylinder 583 is abutting against the corresponding one of the ribs 589 of the second limiting member 582. In addition, in this embodiment, no matter where the window covering 1 is moved while extending or retracting, a rewinding force provided by the spring 560 to the lift cords 40 is set to be less than a downward force generated by the weight of the bottom rail 30 and the covering materials 20 stacked thereon. As a result, if there is no intervention of any other external force, the bottom rail 30 will descend and the lift cords 40 will be correspondingly released from the cord retractor 500, until the window covering 1 is completely extended.

Figure 35:
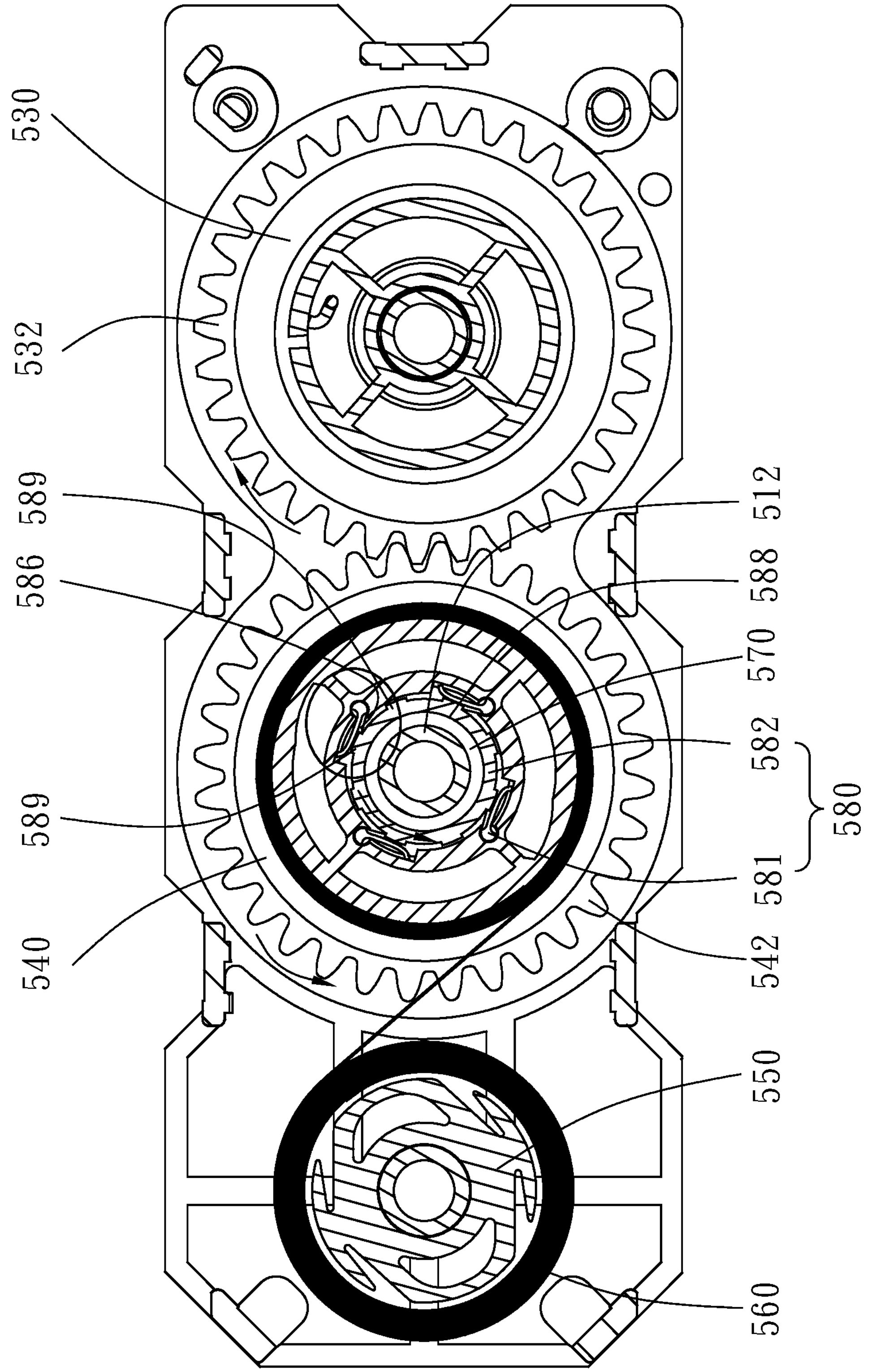
FIG. 35 is a cross sectional view of the cord retractor according to the fifth preferred embodiment of the preset disclosure, illustrating the action of the cord retractor while the window covering is operated to be extended.
Figure 36:
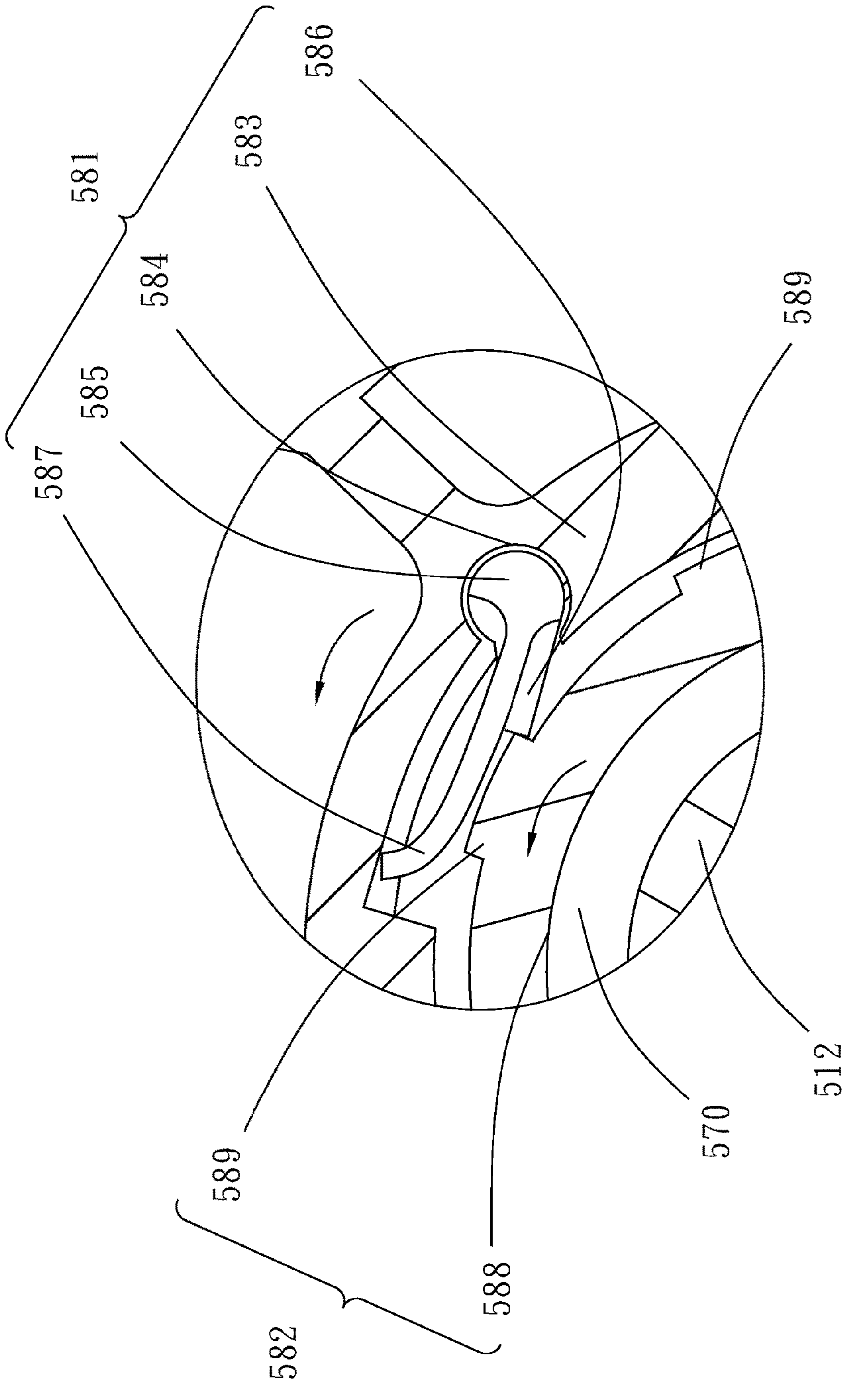
FIG. 36 is an enlarged view of one of the swing elements in FIG. 35.

Please refer to FIGS. 35 to 36, which are the cross sectional views along a horizontal plane at the altitude of the recovering component 587 for clearly showing the interactions among the components of the cord retractor 500 while the window covering 1 is extending. When the window covering 1 is operated to be extended, the user drags down the bottom rail 30, and the lift cords 40 are correspondingly pulled and thereby drive the reeling wheel 530 to rotate in a first direction. In this embodiment, the first direction is a clockwise direction as designated in FIG. 35. The driving wheel 540 engaged with the reeling wheel 530 is driven to rotate counterclockwise. The first limiting member 581 also rotates counterclockwise as it moves together with the driving wheel 540.

When the first limiting member 581 rotates, the swing elements disposed at the grooves 584 also rotate counterclockwise. Referring to FIG. 36, which is a partial enlarged view of FIG. 35, when the first limiting member 581 rotates to a position that each arm 586 has stretched into the recess between the two neighboring ribs 589 and is abutting against the corresponding rib 589, each arm 586 is in a first position, as shown in FIG. 36. At this moment, the first limiting member 581 and the second limiting member 582 are inter-locked, which means the first limiting member 581 is able to drive the second limiting member 582 to rotate together therewith in the counterclockwise direction. The status in which the first limiting member 581 and the second limiting member 582 can rotate together is referred to as the first operation mode, and the counterclockwise direction of the first limiting member 581 is referred to as the locking direction. When the first limiting member 581 rotates in the locking direction, the unidirectional transmission mechanism 580 is driven to operate in the first operation mode.

When the second limiting member 582 rotates together with the first limiting member 581, in a circumstance that a first maximum static friction between the second limiting member 582 and the friction member 570 is greater than a second maximum static friction between the friction member 570 and the second shaft 512, once the driving force is greater than the second maximum static friction between the friction member 570 and the second shaft 512, the first limiting member 581 instantly drives the second limiting member 582 together with the friction member 570 to rotate with respect to the second shaft 512. During the rotation, the driving force has to resist the slip friction between the friction member 570 and the second shaft 512. Therefore, while the window covering 1 is operated to be extended, the friction member 570 rubs against the second shaft 512, as the contact surface between the friction member 570 and the second shaft 512 is in the form of a continuous uninterrupted loop. The friction member 570 continuously provides constant resistance to the cord retractor 500 for assisting the user in determining the moving speed and moving distance of the bottom rail 30 as preventing the bottom rail 30 from uncontrollably falling down.

In some other embodiments, the first maximum static friction between the second limiting member 582 and the friction member 570 is less than the second maximum static friction between the friction member 570 and the second shaft 512. Under the circumstance, once the driving force is greater than the first maximum static friction between the second limiting member 582 and the friction member 570, the second limiting member 582 rotates with respect to the friction member 570. During the rotation, the driving force has to resist the slip friction between the second limiting member 582 and the friction member 570. Since the second limiting member 582 continuously rubs against the friction member 570, the friction member 570 continuously provides constant resistance to the cord retractor 500.

In more detail, while dragging down the bottom rail 30, the lift cords 40 drive the unidirectional transmission mechanism 580 to operate in the first operation mode. In other words, the first limiting member 581 has rotated to the position (referred to as the first position) that each arm 586 has stretched into the recess between the two neighboring ribs 589 and is abutting against the corresponding rib 589. At this moment, even if the user lets go of the bottom rail 30 to stop dragging down the bottom rail 30, there is still a downward resultant force acting on the cord retractor 500 due to the downward force generated by the weight of the bottom rail 30 and the covering materials 20 stacked thereon. Thus, each arm 586 is maintained in the first position as stretching into the recess between the two neighboring ribs 589 and abutting against the corresponding rib 589. Moreover, since the maximum static friction could be generated by the friction member 570 is set to be greater than the difference obtained by subtracting the rewinding force provided by the spring 560 from the downward force generated by the weight of the bottom rail 30 and the covering materials 20 stacked thereon, the bottom rail 30 is maintained in the current position after the user lets go of the bottom rail 30.

Once the user drags down the bottom rail 30 again, the first limiting member 581 directly and immediately drives the second limiting member 582 to rotate. Thus, even if the user drags down the bottom rail 30 in an intermittent way, the friction member 570 accurately provides constant resistance to the cord retractor 500 every time the user starts dragging the bottom rail 30, which is carried out in view of the collaboration of the first limiting member 581 and the second limiting member 582 of the unidirectional transmission mechanism 580.

Figure 37:
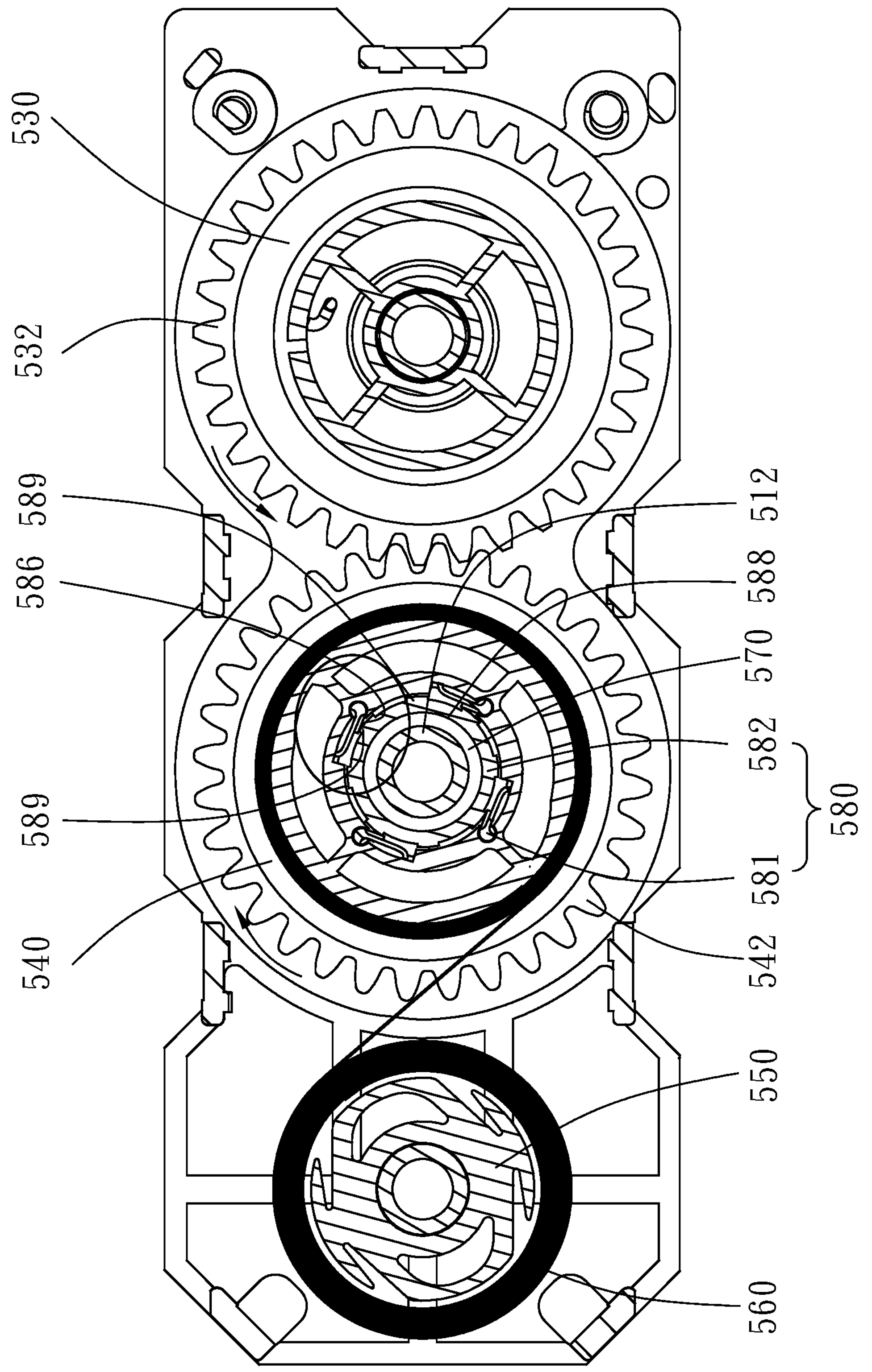
FIG. 37 is a cross sectional view of the cord retractor according to the fifth preferred embodiment of the preset disclosure, illustrating the action of the cord retractor while the window covering is operated to be retracted.
Figure 38:
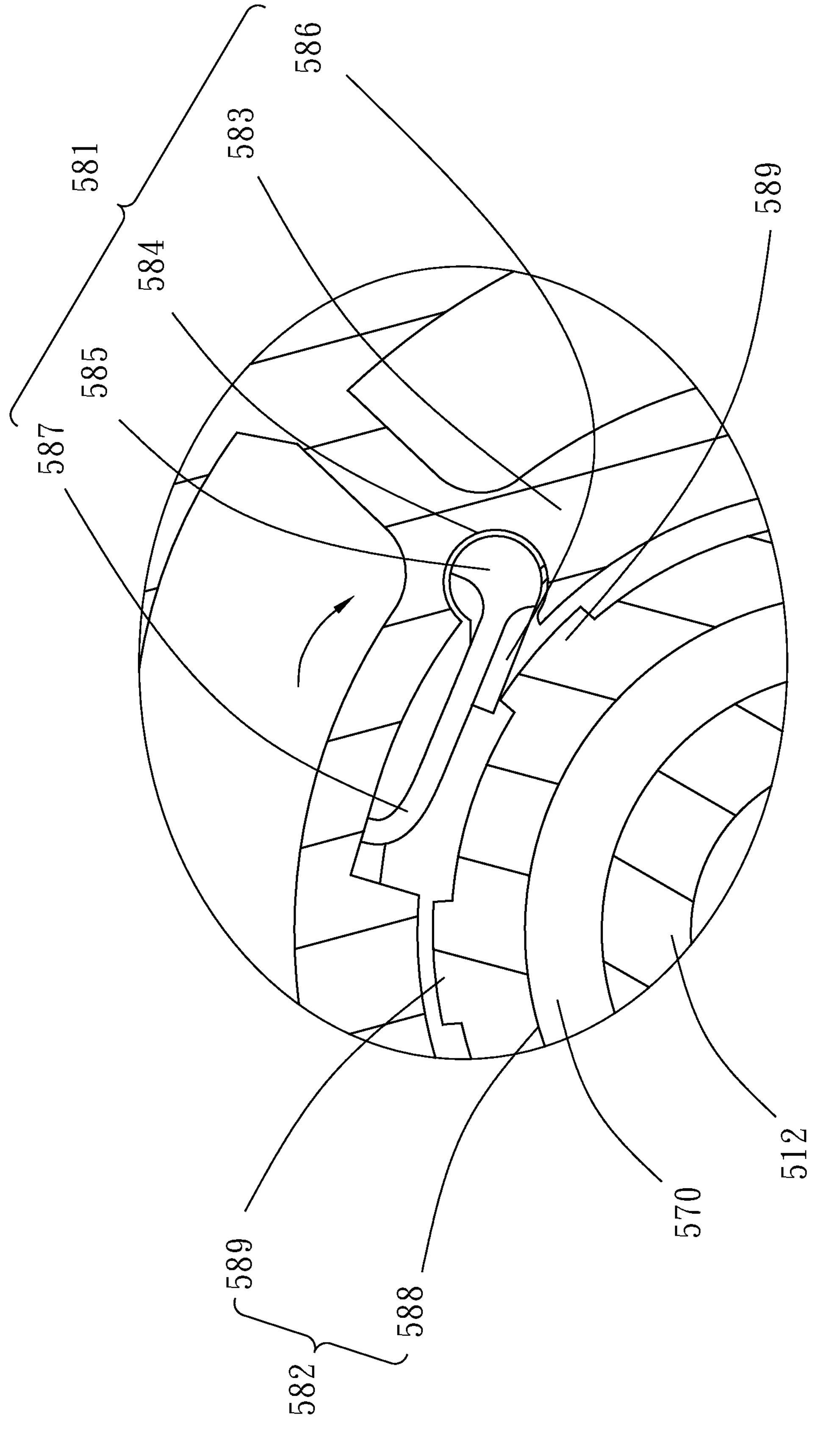
FIG. 38 is an enlarged view of one of the swing elements in FIG. 37.

Please refer to FIGS. 37 and 38, which are the cross sectional views along a horizontal plane at the altitude of the recovering component 587 of the swing element for clearly showing the interactions among the components of the cord retractor 500 while the window covering 1 is retracting. When the window covering 1 is operated to be retracted, the user lifts the bottom rail 30, and the reeling wheel 530 rotates in a second direction for retracting the lift cords 40. The second direction is opposite to the first direction. In this embodiment, the second direction is a counterclockwise direction, as designated in FIG. 37. The driving wheel 540 engaged with the reeling wheel 530 is driven to rotate clockwise. The first limiting member 581 also rotates clockwise as it moves together with the driving wheel 540.

Please refer to FIG. 38, which is a partial enlarged view of FIG. 37. When the first limiting member 581 rotates to the position that each arm 586 is pushed by the corresponding rib 589, each arm 586 moves towards the corresponding recovering component 587 and is located in the second position as shown in FIG. 38. At this moment, the angle between the recovering component 587 and the arm 586 becomes smaller (compared with the angle therebetween when the arm 586 is in the first position). Since the first limiting member 581 keeps rotating, each arm 586 skids over the corresponding rib 589 and returns to the first position as being under the effect of an elastic recovery force provided by the recovering component 587. At this moment, each arm 586 is stretching into the recess between the two neighboring ribs 589 and abutting against the corresponding rib 589, as shown in FIG. 36. During the rotation of the first limiting member 581, the arms 586 are repeating the process of being pushed by the corresponding ribs 589 and deformed, skidding over the top of the corresponding ribs 589, and going back to the first position as stretching into the recess between the neighboring ribs 589 and abutting against the corresponding ribs 589. In other words, each arm 586 keeps swinging between the first position and the second position reciprocatedly. As a result, rather than driving the second limiting member 582 to rotate, the first limiting member 581 only skims over the second limiting member 582 when rotating clockwise with respect to the second limiting member 582. This status in which the first limiting member 581 rotates with respect to the second limiting member 582 is referred to as the second operation mode, and the clockwise direction of the first limiting member 581 is referred to as the unlocking direction. When the first limiting member 581 rotates in the unlocking direction, the unidirectional transmission mechanism 580 is driven to operate in the second operation mode.

When the unidirectional transmission mechanism 580 is in the second operation mode, the second limiting member 582 does not rotate together with the first limiting member 581, which means there is no relative rotation between the second limiting member 582 and the friction member 570, or between the second limiting member 582 and the second shaft 512. The second limiting member 582 does not tend to rotate with respect to the friction member 570, and does not tend to drive the friction member 570 to rotate with respect to the second shaft 512. As a result, the driving force has no need to resist the first maximum static friction between the second limiting member 582 and the friction member 570 or the second maximum static friction between the friction member 570 and the second shaft 512. In the meantime, there is no slip friction between any two of the second limiting member 582, the friction member 570 and the second shaft 512. Therefore, while the window covering 1 is retracting, the friction member 570 does not provide resistance to the cord retractor 500, which saves labor by reducing the force required for lifting the bottom rail 30, and also ensures that the rewinding force provided by the spring 560 is effectively applied to the driving wheel 540 and the reeling wheel 530 as they rotate for retracing the lift cords 40.

Once the user stops lifting the bottom rail 30 and lets go of the bottom rail 30, a downward resultant force acts on the cord retractor 500 again due to the reason that the downward force generated by the weight of the bottom rail 30 and the covering materials 20 stacked thereon is greater than the rewinding force provided by the spring 560. Thus, each arm 586 of the first limiting member 581 then returns to the first position as stretching into the recess between the two neighboring ribs 589 and abutting against the corresponding rib 589, as shown in FIG. 36. The downward force generated by the weight of the bottom rail 30 and the covering materials 20 stacked thereon, the rewinding force provided by the spring 560, and the static friction correspondingly generated by the friction member 570 make a balance again, which maintains the bottom rail 30 in the current position.

In view of the action of the unidirectional transmission mechanisms 180, 280, 380, 480 and 580 mentioned above, the friction members 170, 270, 370, 470 and 570 provide resistance in only one rotating direction of the reeling wheel, which makes the cord retractors 100, 200, 300, 400 and 500 of the present disclosure capable of providing different resistance to ensure the overall balance of the window covering 1 while extending or retracting the window covering 1. The resistance provided by the friction members 170, 270, 370, 470 and 570 is constant, and is provided accurately at the time when the user executes dragging-down operation, which is carried out by collaboration of the first limiting members 181, 281, 381, 481 and 581 as well as the second limiting members 182, 282, 382, 482 and 582. The constant resistance is beneficial to prevent the bottom rail 30 from uncontrollably falling down, which makes the user easier to determine the moving speed and moving distance of the bottom rail 30. Meanwhile, because the way that the cord retractors 100, 200, 300, 400 and 500 provide resistance is limited to single direction, the user can be easier to move the bottom rail 30 in another direction as the resistance is not provided then. Moreover, the maximum static friction could be generated by the friction members 170, 270, 370, 470 and 570 is set to be always greater than the difference obtained by subtracting a rewinding force provided by the springs 160, 260, 360, 460 and 560 from a downward force generated by the weight of the bottom rail 30 and the covering materials 20 stacked thereon. Therefore, no matter when the user stops dragging down the bottom rail 30 and where the bottom rail 30 is stopped, the bottom rail 30 is stably maintained in the latest position, therefore a shading effect can be provided accurately.

In all above-mentioned embodiments, the cord retractor is disposed on the upper rail, and the way of operating the window covering is exemplified by operating the bottom rail. However, in some other embodiments, the window covering may further comprise a middle rail, and the cord retractor can be disposed on the middle rail or the bottom rail other than the upper rail. In addition, the user can operate the window covering by any movable rail other than the one on which the cord retractor is disposed.

The embodiments described above are only some exemplary embodiments of the present disclosure. All equivalent structures which employ the concepts disclosed in this specification and the appended claims should fall within the scope of the present disclosure.

What is claimed is:

1. A cord retractor for a window covering, comprising:
a housing, comprising a bottom plate and a shaft situated on a first side of the bottom plate;
a driving wheel, situated on the first side of the bottom plate;
a spring, received in the housing and comprising a first end coupled with the driving wheel, wherein the spring is wound on the driving wheel or unwound from the driving wheel according to a rotating direction of the driving wheel;
a reeling wheel, situated on the first side of the bottom plate and coupled with the driving wheel for rotating with the driving wheel;
a friction member in a closed loop shape and surrounding the shaft;
a first limiting member, situated outside the friction member and comprising an arm; and
a second limiting member, situated outside the first limiting member and comprising a plurality of ratchets for engaging with the arm of the first limiting member, wherein the second limiting member is driven by the reeling wheel for rotating with the reeling wheel;
wherein when the reeling wheel rotates in a first direction, the second limiting member is driven to rotate in a locking direction with respect to the first limiting member, thereby making the arm of the first limiting member engaged between two neighboring ratchets of the second limiting member, after which the first limiting member rotates together with the second limiting member, and one of a first frictional force and a second frictional force is generated for providing substantially constant resistance to rotation of the reeling wheel;
wherein the first frictional force is generated between the first limiting member and the friction member, as the first limiting member rotates with respect to the friction member;
wherein the second frictional force is generated between the friction member and the shaft, as the friction member is driven by the first limiting member to rotate with respect to the shaft; and
wherein when the reeling wheel rotates in a second direction opposite to the first direction, the second limiting member is driven to rotate in an unlocking direction with respect to the first limiting member, and the arm of the first limiting member skids over the ratchets of the second limiting member, so that the first limiting member is not driven to rotate together with the second limiting member, and the friction member does not rotate with respect to the shaft or the first limiting member, therefore the friction member does not provide resistance to the rotation of the reeling wheel when the reeling wheel rotates in the second direction.

2. The cord retractor of claim 1, wherein the friction member comprises at least one of a rubber component, a silicon component and an elastic plastic component, and an inside diameter of the friction member does not substantially change while the friction member provides resistance to the rotation of the reeling wheel.

3. The cord retractor of claim 1, wherein an inner wall of the first limiting member abuts the friction member; wherein when a first maximum static friction between the friction member and the first limiting member is greater than a second maximum static friction between the friction member and the shaft, and the reeling wheel rotates in the first direction, the friction member is driven to rotate together with the first limiting member with respect to the shaft for providing resistance to the rotation of the reeling wheel; and
wherein when the first maximum static friction between the friction member and the first limiting member is less than the second maximum static friction between the friction member and the shaft, and the reeling wheel rotates in the first direction, the first limiting member is driven to rotate with respect to the friction member for providing resistance to the rotation of the reeling wheel while the friction member and the shaft do not rotate with respect to each other.

4. The cord retractor of claim 3, wherein the first limiting member further comprises a main body surrounding the friction member and the inner wall of the first limiting member is located on a part of the main body facing the friction member;
wherein the arm of the first limiting member extends from the main body towards the second limiting member; and
wherein the inner wall of the first limiting member further comprises at least one bump closely engaged with the friction member for configuring the first maximum static friction to be greater than the second maximum static friction such that the friction member rotates or stays still together with the first limiting member.

5. The cord retractor of claim 1, wherein the first limiting member further comprises a main body surrounding the friction member;
wherein the arm extends from the main body towards the second limiting member; and
wherein the main body comprises a first engaging portion on an inner wall of the main body facing the friction member, and the friction member further comprises a second engaging portion on an outer wall of the friction member facing the main body for engaging with the first engaging portion, the friction member thereby rotates or stays still together with the first limiting member.

6. The cord retractor of claim 1, wherein the first limiting member further comprises a main body surrounding the friction member;
wherein the arm extends from the main body towards the second limiting member, and the arm is elastic for generating an elastic recovery force when deformed;
wherein when the reeling wheel rotates in the first direction, the arm stays in a first position so that the second limiting member rotates together with the first limiting member;
wherein when the reeling wheel rotates in the second direction, the ratchets of the second limiting member sequentially deform the arm and push the arm to a second position;
wherein the elastic recovering force enables the deformed arm to return to the first position when the arm is not pushed by any ratchet of the ratchets of the second limiting member; and
wherein the arm moves between the first position and the second position for allowing the second limiting member to rotate with respect to the first limiting member.

7. The cord retractor of claim 1, wherein the driving wheel comprises a hollow body surrounding the second limiting member, and the second limiting member is fixedly situated on an inner wall of the driving wheel and immovable with respect to the driving wheel for rotating together with the driving wheel.

8. The cord retractor of claim 1, wherein the reeling wheel comprises a hollow body surrounding the second limiting member, and the second limiting member is fixedly situated on an inner wall of the reeling wheel and immovable with respect to the reeling wheel for rotating together with the reeling wheel.

9. The cord retractor of claim 1, further comprising a transmission wheel for rotating correspondingly with the reeling wheel;

wherein the transmission wheel comprises a hollow body surrounding the second limiting member, and the second limiting member is fixedly situated on an inner wall of the transmission wheel and immovable with respect to the transmission wheel;

wherein when the reeling wheel rotates, the reeling wheel drives the transmission wheel and the second limiting member to rotate correspondingly.

10. The cord retractor of claim 1, wherein the reeling wheel further comprises a reeling gear, and the driving wheel further comprises a driving gear;

wherein the reeling gear is meshed with the driving gear, so that the reeling wheel and the driving wheel are configured to rotate in unison; and wherein when the reeling wheel rotates in the first direction, the driving wheel rotates accordingly to wind the spring on the driving wheel.

11. A cord retractor for a window covering, comprising:

a housing, comprising a bottom plate and a shaft situated on a first side of the bottom plate;

a driving wheel, situated on the first side of the bottom plate;

a spring, received in the housing and comprising a first end coupled with the driving wheel, wherein the spring is wound on the driving wheel or unwound from the driving wheel according to a rotating direction of the driving wheel;

a reeling wheel, situated on the first side of the bottom plate and coupled with the driving wheel for rotating with the driving wheel;

a friction member being a single one-piece body in a closed loop shape surrounding the shaft;

a unidirectional transmission mechanism coupled with the friction member and the reeling wheel and operated in one of a first operation mode and a second operation mode according to a rotating direction of the reeling wheel;

wherein when the reeling wheel rotates in a first direction, the unidirectional transmission mechanism is driven to operate in the first operation mode with the friction member to generate a frictional force for providing substantially constant resistance to rotation of the reeling wheel; and wherein when the reeling wheel rotates in a second direction opposite to the first direction, the unidirectional transmission mechanism is driven to operate in the second operation mode and restricts the friction member from providing resistance to the rotation of the reeling wheel.

12. A window covering, comprising:

an upper rail;

one or more covering materials, provided below the upper rail;

a bottom rail, provided below the one or more covering materials;

a lift cord coupled between the upper rail and the bottom rail;

a cord retractor for receiving or releasing the lift cord for respectively moving the bottom rail towards or away from the upper rail, wherein the cord retractor comprises:

a housing, comprising a bottom plate and a shaft situated on a first side of the bottom plate;

a driving wheel, situated on the first side of the bottom plate;

a spring, received in the housing and comprising a first end coupled with the driving wheel, wherein the spring is wound on the driving wheel or unwound from the driving wheel according to a rotating direction of the driving wheel;

a reeling wheel, situated on the first side of the bottom plate and coupled with the driving wheel for rotating with the driving wheel;

a friction member in a closed loop shape and surrounding the shaft;

a first limiting member, situated outside the friction member and comprising an arm; and a second limiting member, situated outside the first limiting member and comprising a plurality of ratchets for engaging with the arm of the first limiting member, wherein the second limiting member is driven by the reeling wheel to rotate with the reeling wheel;

wherein when the reeling wheel rotates in a first direction, the second limiting member is driven to rotate in a locking direction with respect to the first limiting member, thereby making the arm of the first limiting member engaged between the two neighboring ratchets of the plurality of ratchets of the second limiting member, after which the first limiting member rotates together with the second limiting member, and one of a first frictional force and a second frictional force is generated for providing substantially constant resistance to rotation of the reeling wheel;

wherein the first frictional force is generated between the first limiting member and the friction member, as the first limiting member rotates with respect to the friction member;

wherein the second frictional force is generated between the friction member and the shaft, as the friction member is driven by the first limiting member to rotate with respect to the shaft; and wherein when the reeling wheel rotates in a second direction opposite to the first direction, the second limiting member is driven to rotate in an unlocking direction with respect to the first limiting member, and the arm of the first limiting member skids over the ratchets of the second limiting member, so that the first limiting member is not driven to rotate together with the second limiting member, and the friction member does not rotate with respect to the shaft or the first limiting member, such that the friction member does not provide resistance to the rotation of the reeling wheel while the reeling wheel rotates in the second direction.

13. The window covering of claim 12, wherein the friction member comprises at least one of a rubber component, a silicon component and an elastic plastic component, and an inside diameter of the friction member does not substantially change while the friction member provides resistance to the rotation of the reeling wheel.

14. The window covering of claim 12, wherein when the reeling wheel rotates in the first direction for releasing the lift cord to move the bottom rail away from the upper rail, the friction member provides resistance to the rotation of the reeling wheel;

wherein when the reeling wheel rotates in the second direction for receiving the lift cord to move the bottom rail towards the upper rail, the friction member does not provide resistance to the rotation of the reeling wheel.

15. The window covering of claim 12, wherein an inner wall of the first limiting member abuts the friction member;

wherein when a first maximum static friction between the friction member and the first limiting member is greater than a second maximum static friction between the friction member and the shaft, and the reeling wheel rotates in the first direction, the friction member is driven to rotate together with the first limiting member with respect to the shaft for providing resistance to the rotation of the reeling wheel; and wherein when the first maximum static friction between the friction member and the first limiting member is less than the second maximum static friction between the friction member and the shaft, and the reeling wheel rotates in the first direction, the first limiting member rotates with respect to the friction member for providing resistance to the rotation of the reeling wheel, while the friction member and the shaft do not rotate with respect to each other.

16. The window covering of claim 15, wherein the first limiting member further comprises a main body surrounding the friction member and the inner wall is situated on a part of the main body facing the friction member;

wherein the arm of the first limiting member extends from the main body towards the second limiting member; and wherein the inner wall further comprises at least one bump closely engaged with the friction member for configuring the first maximum static friction to be greater than the second maximum static friction, so that the friction member rotates or stays still together with the first limiting member.

17. The window covering of claim 12, wherein the first limiting member further comprises a main body surrounding the friction member, and the arm extends from the main body towards the second limiting member;

wherein the main body comprises a first engaging portion on an inner wall of the main body facing the friction member, and the friction member further comprises a second engaging portion on an outer wall of the friction member facing the main body for engaging with the first engaging portion, the friction member thereby rotates or stays still together with the first limiting member.

* * * * *